(12) United States Patent
Sesmun et al.

(10) Patent No.: US 7,313,631 B1
(45) Date of Patent: Dec. 25, 2007

(54) DNS UPDATING IN COMMUNICATION NETWORK

(75) Inventors: Amardiya Sesmun, Swindon (GB); Alistair Thomas Donald Munro, Bristol (GB)

(73) Assignee: University of Bristol, Bristol (GB)

( * ) Notice: Subject to any disclaimer, the term of this patent is extended or adjusted under 35 U.S.C. 154(b) by 621 days.

(21) Appl. No.: 10/070,326

(22) PCT Filed: Sep. 5, 2000

(86) PCT No.: PCT/GB00/03409

§ 371 (c)(1),
(2), (4) Date: Jun. 11, 2002

(87) PCT Pub. No.: WO01/19053

PCT Pub. Date: Mar. 15, 2001

(30) Foreign Application Priority Data

Sep. 6, 1999 (GB) ................................. 9921029.6

(51) Int. Cl.
*G06F 15/16* (2006.01)
(52) U.S. Cl. ....................... 709/245; 370/310; 709/218
(58) Field of Classification Search ................ 709/227, 709/245; 370/338, 356, 389
See application file for complete search history.

(56) References Cited

U.S. PATENT DOCUMENTS 5,325,362 A * 6/1994 Aziz ........................... 370/405
6,119,171 A * 9/2000 Alkhatib ..................... 709/245
6,161,008 A * 12/2000 Lee et al. .................... 455/415

(Continued)

FOREIGN PATENT DOCUMENTS

EP 1017 208 A2 7/2000

OTHER PUBLICATIONS

Perkins, Charles E. "Mobile Networking Through Mobile IP." IEEE Internet Computing, Jan.-Feb. 1998. 58-69.*

(Continued)

*Primary Examiner*—Jason Cardone
*Assistant Examiner*—Jeffrey R. Swearingen
(74) *Attorney, Agent, or Firm*—Townsend and Townsend and Crew LLP

(57) ABSTRACT

In a communication network in which terminals (11) are mobile in the network, the mobility must be managed, and in particular the location of the mobile terminal needs to be determined. Networks each have an associated name server (13) and the name server (13) stores a care-of-address for the terminal (11), as well as a permanent address. As the terminal moves from one subnet of the network to another the care-of-address is changed to reflect the current subnet. Therefore, the input of the name of the mobile terminal (11) identifies via the care-of-address the subnet in which the terminal is currently located. The network is divided with domains each with its own name server (13, 14) as the terminal (11) moves from its home domain to a foreign domain, the name server (14) of that foreign domain may be updated with details of the mobile terminal (11) so that any query to the terminal (11) originating in the foreign domain may be resolved within that foreign domain. A care-of-address may be stored in the name server (14) of that foreign domain. Then, the address of the name server (14) of that foreign domain may be used as the care-of-address in the name server of the home domain (13).

12 Claims, 9 Drawing Sheets

U.S. PATENT DOCUMENTS

| | | | |
|---|---|---|---|
| 6,201,965 B1 * | 3/2001 | Mizell et al. | 455/433 |
| 6,243,749 B1 * | 6/2001 | Sitaraman et al. | 709/223 |
| 6,307,843 B1 * | 10/2001 | Okanoue | 370/312 |
| 6,356,761 B1 * | 3/2002 | Huttunen et al. | 455/456.1 |
| 6,377,990 B1 * | 4/2002 | Slemmer et al. | 709/225 |
| 6,393,482 B1 * | 5/2002 | Rai et al. | 709/225 |
| 6,421,732 B1 * | 7/2002 | Alkhatib et al. | 709/245 |
| 6,427,170 B1 * | 7/2002 | Sitaraman et al. | 709/226 |
| 6,434,627 B1 * | 8/2002 | Millet et al. | 709/245 |
| 6,473,411 B1 * | 10/2002 | Kumaki et al. | 370/331 |
| 6,473,413 B1 * | 10/2002 | Chiou et al. | 370/331 |
| 6,510,153 B1 * | 1/2003 | Inoue et al. | 370/354 |
| 6,515,974 B1 * | 2/2003 | Inoue et al. | 370/331 |
| 6,587,882 B1 * | 7/2003 | Inoue et al. | 709/227 |
| 6,608,832 B2 * | 8/2003 | Forslow | 370/353 |
| 6,614,774 B1 * | 9/2003 | Wang | 370/338 |

OTHER PUBLICATIONS

Perkins, Charles E. "Mobile IP." IEEE Communications Magazine, May 1997. 84-99.*

Perkins, Charlie. "Mobile IP and Security Issue: An Overview." Internet Technologies and Services, 1999. 131-148.*

Perkins, Charles E. "Mobile-IP, Ad-Hoc Networking, and Nomadicity." Computer Software and Applications Conference, 1996. COMPSAC '96 Proceedings. Aug. 21-23, 1996. 472-476.*

Perkins, C. RFC 2002: IP Mobility Support. Oct. 1996.*

Lee, David C., et al., *The Next Generation of the Internet: Aspects of the Internet Protocol Version 6*, IEEE Network, pp. 28-33, Jan./Feb. 1998.

Amardiya Sesmun, Liang Q. Liu, Maria R. Fuente, Siamak Vahid, Alistair Munro, Mobility Management Techniques, MVCE/BRS/WPNO1/TN12, Mar. 1998.

* cited by examiner

DNS UPDATING IN COMMUNICATION NETWORK

BACKGROUND OF THE INVENTION

1. Field of the Invention

The present invention relates to communication networks, and in particular, to communication networks in which terminals and/or users are mobile in the network. The present invention is applicable, for example, to the Internet where a terminal or user moves from one site to another. The present invention is also applicable to mobile telecommunication devices such as wireless telephones.

2. Summary of the Prior Art

Mobility management is an essential and integral part of mobile communication networks in order to ensure terminal mobility as a minimum requirement. Two distinct sets of functions need to be provided, namely location management and handover functions. Location management functions are required to keep track of mobile terminals/users as they roam and also locate them when there is a request for a connection to them. Handover functions take care of maintaining ongoing connections as users move and change their point of attachment in the network.

It is envisaged that mobile communication systems will need to possess characteristics that are far more advanced than those presently available in current systems. In effect, global and seamless roaming of users across a completely heterogeneous environment is desirable, where different network operators and service providers co-exist. These different networks may need to operate at different layers of cells and may need to use different air interfaces. Also, it is desirable that users have access to multimedia services. Furthermore, users may need to be able to roam to different networks and access the same services they are subscribed to in their home network with the same "look and feel" that they have at home.

These desirable characteristics place severe requirements on the network in terms of the mobility management protocols, bearing in mind aspects such as the amount of signalling traffic generated in the network, the available system capacity and the quality of service offered to users. The efficiency of a location management strategy is evaluated in terms of various factors namely the signalling traffic generated, the database structure it requires or how quickly connection can be set up. The optimality of a connection that is set up for communication is another factor that has to be considered. Handover is assessed in terms of how fast it can be carried out, how much traffic is lost, to what extent it affects the quality of service and also the optimality of new connections. Handover efficiency also depends on the parameters used for its initiation and control. The process of handover generates signalling traffic so that handover strategies have to address issues of how to reduce the signalling traffic and maximise the use of the capacity of the system.

Different networks have different mobility management techniques and addressing schemes. In order to do global mobility management, it is necessary to analyse aspects of routing and connection set-up, addressing, signalling and database access for different networks. In cellular systems, location management relies on a structure of databases consisting of the HLR (Home Location Register) and VLR (Visitor Location Register). Queries to the databases enable exact positioning of the mobile terminal prior to set-up of a connection. This ensures that the connection is set up along an optimal route. In data networks CDPD (Cellular Digital Packet Data), GPRS (General Packet Register Service), Mobile IP (Internet Protocol), generally routing to mobile stations is done inefficiently. Packets are always routed to the home network of the mobile terminal irrespective of whether the mobile terminal is in its home network or not. The packets are forwarded to the current location of the mobile terminal from the home network. This feature is known as triangular routing. The first objective of the research is to build an efficient mobility management strategy in data networks, specifically IP, in order to overcome the sub-optimal routing problems. This can then be extended to integrate IP with other systems. For global mobility management, there is also a need to provide a means for global addressing to accommodate the different types of addresses used by different networks. The use of the IPv6 address space for that purpose is envisaged.

The structure and distribution of the database used for mobility management has a direct impact on the signalling traffic, rate of database access and therefore the efficiency of the mobility management scheme. The optimality of the routing also depends on how the databases are used. The distribution of the database (centralised, distributed, hierarchical) is also an issue, together with the type of databases (relational, object-oriented).

Since it is envisaged that mobile users should be able to roam seamlessly and globally across different networks, they will need to have access to services transparently and should also be reachable irrespective of their location. Such expectations call for the need to develop a location management scheme that can be used across different networks in order to provide global coverage of mobile terminals. The basic requirements to achieve global roaming are that a mobile terminal has to recognisable and reachable in any network. Deriving this scheme imposes quite a challenge due to the heterogeneity of the environment given that each network has its own mobility management scheme as well as its own addressing scheme.

Location management is the process whereby mobile terminals inform the network of their whereabouts and network entities maintain updated information of location of mobiles for purposes of setting up and handing over connections. Location management can be seen as consisting of two phases: mobile tracking and mobile locating. Mobile tracking essentially involves mobile terminals notifying the network of their current location and network entities updating the information accordingly. Mobile locating is the process whereby a specific query is launched in order to determine the position of the mobile prior to setting up a connection. The location management strategy, which is dictated by the approach to mobile tracking and locating, has a direct impact on the efficiency of routing in the network, the amount of signalling traffic generated and the number of accesses to databases which are used for mobility management.

As was discussed in the report by A. Sesmun, L. Q. Liu, M. Fuente, S. Vahid and A. Munro, "Examination of mobility management techniques in current systems and outline proposals for further research", Mobile VCE Networks Programme, Deliverable MVCE/BRS/WPN01/D12, May 1998, different networks have different mobility management schemes but in essence, two approaches can be identified depending on how the mobile locating phase is carried out. In cellular networks, mobility management relies on a structure of databases to keep track of mobile terminals as they roam. Upon a need to establish a connection to a mobile terminal, an explicit locating phase is required to determine the position of the terminal. In the Internet, the mobility management protocol Mobile IP integrates the mobile locating phase with connection set-up so that the initiator of the call immediately starts to send traffic assuming that the mobile is in its home subnet. Routers in the home network then take care of forwarding the traffic to wherever the terminal is roaming. In Wireless ATM (Asynchronous Transfer Mode), the location register solution implements an explicit mobile locating phase whereas the Mobile PNNI (Private Network to Network Interface) implementation requires that mobile locating be integrated with connection set-up. CDPD and GPRS both have recourse to an integrated approach.

The first approach is associated with the benefit that an optimal connection to a mobile can be set-up once its current location has been established at the expense of more signalling traffic being generated. The second approach ensures fast connection set-up but routing of traffic may require subsequent optimisation. Always routing via the home network is very inefficient especially if the caller and callee are effectively not far from each other.

Therefore, in the derivation of a global location management scheme for heterogeneous networks, the different aspects that need to be considered are:
  (i) how to carry out mobile tracking and locating;
  (ii) impact of the location management strategy on optimality of routing;
  (iii) signalling traffic generated; and
  (iv) the database architecture for mobility management purposes.

Different networks also have different addressing schemes. Telephone numbers follow the E.164 specification of the International Telecommunications Union. Internet addresses, usually known as IP addresses, are of two protocol versions, IPv4 and IPv6 and are used to refer to host interfaces rather than endpoints. The Network Service Access Point format as specified by the International Standards Organisation is used for addressing in ATM networks. A global location management scheme would therefore require a uniform addressing scheme in order to recognise terminals in different networks.

In the Mobile IP protocol known as proposed by the Internet Engineering Task Force, a mobile is always identified by its home address, irrespective of its point of attachment in the network. When the mobile moves to a different subnet, or a foreign subnet, it acquires a temporary address referred to as a care-of-address. It then needs to register this address with its home agent by sending a binding update to the router. The home agent is a router on the mobile terminal's home link. Thereafter, the home agent can intercept any packets intended for the mobile and forwards them to the mobile's current location. This is the basic operation of Mobile IPv4 protocol. Mobile IPv4 leads to sub-optimal routing. All packets being routed via the home network causes a feature referred to as triangular routing, which is inefficient especially if the correspondent host and the mobile host are not far from each other.

In the protocol known as Mobile IPv6, it is proposed to optimise the routing once communication has been established between two hosts via the introduction of more signalling messages. Besides sending binding updates to the home agent, a mobile host can send similar updates to a correspondent host if it detects that it is receiving packets that are being forwarded from that host by the home agent. The correspondent host is then informed of the current point of attachment of the mobile and can send any further packets directly to the host. Although this approach subsequently optimises the routing, it does not eliminate the initial triangular routing.

Thus, in existing systems when a mobile node (terminal) moves to a foreign subnet (being a subnet other than its home subnet), it acquires a care-of-address. In Mobile IPv4, it may use a foreign agent care-of-address or a colocated care-of-address. In Mobile IPv6, it uses a colocated care-of-address only and the foreign agent is not needed. The mobile node then sends a binding update to the home agent. A binding update is an association between the permanent address and the care-of-address of the mobile. The home agent keeps a record of the binding. A resource record in the name server only stores the name of a terminal and its permanent address (and also other fields not relevant here).

When a correspondent node wants to communicate to a mobile node (or a fixed node), the correspondent node need not know if the recipient is mobile or not. The correspondent node supplies an application with the name of the host. This results in a query launched to the name server, and resolution of the name to an address yields the permanent address as a response. The correspondent node uses the permanent address to send packets to the mobile node. The home agent intercepts these packets and tunnels them to the mobile node. This routing via the home agent is sub-optimal. If the mobile node is using a co-located care-of-address, the end of the tunnel is the mobile node. If the mobile is using a foreign agent care-of-address, the end of the tunnel is the foreign agent, in which case the foreign agent extracts the packet and sends it to the mobile. Subsequent routing optimisation takes place in mobile IPv6.

SUMMARY OF THE INVENTION

The present invention departs from this by considering the fact that networks each have a name server associated therewith. In the existing systems, the name server is not used in location management. The present invention, in its first aspect, proposes that the name server is used in a way not previously envisaged. In existing systems, the name server stores the name of the mobile terminal and its permanent address. In this first aspect of the present invention, the name server also stores a care-of-address and also preferably stores information indicating the type of address. The care-of-address indicates the temporary address of a mobile terminal.

The domain covered by a name server is normally divided into a plurality of subnets. One of the subnets will be the "home" subnet for a mobile terminal. When the mobile terminal is in that home subnet the care-of-address and the permanent address may be the same. However, in this first aspect of the present invention, when the mobile terminal moves to a second subnet, the care-of-address is changed to reflect the new subnet. As the mobile terminal moves from subnet to subnet, the care-of-address changes each time. The home agent updates the home name server each time the mobile terminal moves from one subnet to another, since the mobile terminal sends a binding update to the home agent each time it moves in this way and acquires a care-of-address.

In this first aspect of the present invention, even if the mobile terminal moves to a foreign domain, and possibly moves from subnet to subnet within that foreign domain, the home name server continues to be updated with a care-of-address representing the subnet in which the mobile terminal is currently located.

Thus, according to this first aspect, the present invention may provide a method of operating a network, the network comprising a domain having a name server associated therewith, said domain having a plurality of subnets, wherein:
  a mobile terminal is associated with said domain and with a first subnet within said domain, said name server stores a name for said mobile terminal, a permanent address for said mobile terminal, and a second address which includes an identification of said first subnet, whereby input to the network of said name for said mobile terminal causes said name server to output said second address;
  when said mobile terminal moves to a second subnet within said domain, said name server changes said second address to a third address which third address contains an identification of said second subnet, whereby input to the network of said name for said mobile terminal causes said name server to output said third address.

This first aspect will be referred to subsequently as one-level updating; the care-of-address is updated each time the mobile terminal moves from one subnet to from one subnet to another, whether that subnet is in its home domain or in a foreign domain. With this system, when a correspondent wishes to communicate with the mobile terminal, a query is launched to the name server and the address returned is the care-of-address of the mobile terminal. The correspondent then uses the care-of-address to send packets to the mobile terminal. Those packets thus reach the mobile terminal directly, and the home network is bypassed when the mobile terminal is in a foreign subnet. Thus, more optimal routing is achieved than in prior art arrangements. Of course, if the network also contains fixed terminals, the care-of-address for such terminals is the same as the permanent address. The care-of-address of a mobile terminal is also the same as its permanent address when it is in its home subnet of its home domain.

It is normal for the result of a query to a name server to be cached in the local name server of the domain of the correspondent. Thus, if the same query is initiated at a later stage, it can be resolved locally. The present invention may involve a similar feature. The lifetime of the cache entry may need to be reduced because, if the terminal is mobile, the cache entry is valid for a shorter period of time.

In a development of the first aspect of the present invention, when the mobile terminal is moving in a foreign domain, the foreign agent of that foreign domain may update the name server associated with that domain (a foreign name server for the mobile terminal) with the details of the mobile terminal. In that case, any query originating from the local subnet of that foreign domain can be resolved locally.

A further development of this first aspect of the present invention considers the case where the mobile terminal moves to a foreign domain. If there is one-level updating, as previously discussed the care of address of the home name server reflects the foreign subnet in which the mobile terminal is now located. However, that foreign network itself has a name server which, as previously mentioned, may store a local address for the mobile terminal. Therefore, in this development of the first aspect of the present invention, it is proposed that, when a mobile terminal moves to a foreign network, the care-of-address thus generated is stored at the foreign name server, and a binding update, which is an association between the permanent address of the mobile and the address of the foreign name server is sent to the home agent. The address of the foreign name server then becomes the care-of-address in the home name server. Thus, in this development, when the mobile terminal moves to a foreign name server, it has a care-of-address stored in the foreign name server of that domain, and the home name server stores its permanent address and the address of the foreign name server of the domain in which it is moving.

Effectively, this system may be considered to be one in which the name server of the domain in which the mobile terminal is located stores a care-of-address for the mobile terminal, and the home name server stores either the address of the local name server, when the home name server and local name server are different, or else the care-of-address when the local name server is the home name server.

In this arrangement, updating of the home name server only takes place when the mobile terminal moves from one domain to another. Whilst moving within a domain, the mobile terminal may acquire different care-of-addresses as it moves from one subnet to another, but only the local name server is updated. This development is considered to be two-level updating. The process of updating the local or foreign name server is termed local update whereas the process of updating the home name server is referred to as a global update.

In such an arrangement, it is then normally important that update signals require an extra data item (flag) to indicate whether the address held in the care-of-address field is the address of the mobile terminal, or the address of another name server.

As long as the mobile terminal moves in the domain which falls under the authority of a foreign name server, even if this involves changes of subnets and hence changes of care-of-addresses, only local updating at that foreign name server is needed. Updating at the home name server is only needed when the mobile terminal moves to a network under the authority of a further foreign name server, or back to the original home names server.

Thus, when it is desired to communicate with a mobile terminal, a query is sent to the home name server. Assume now that the mobile terminal is, in fact, under the authority of a foreign name server. The home name server then identifies the foreign name server, so that signals may then be sent to that foreign name server to identify the current care-of-address. The home name server does not need to know the current care-of-address. Once the correspondent obtains the care-of-address of the mobile, communication can be established directly and the home network can be bypassed. It should be noted that the term "foreign" merely means a part of the Internet served by a name server which is not the original name server of a particular mobile terminal.

Preferably, the home name server continues to store a permanent address for the mobile terminal, so that the address of the foreign name server may be stored in the same field which stores a care-of-address when the mobile terminal moves within the domain served by the home name server. In effect, the address of the foreign name server replaces the care-of-address when the mobile moves from the domain served by the home name server to a domain served by the foreign name server. This is the two-level updating previously mentioned.

It should be noted that the Domain Name System is the distributed name service used in the Internet, which maintains a mapping between names and addresses. Domain names provide a mechanism for naming resources in such a way that the names are usable in different hosts, networks and administrative organisations. The Domain Name System is seen as consisting of three main components: Domain Name Space and Resource Records, Name Servers, and Resolvers.

The Domain Name Space and Resource Records specify the tree structured name space and data associated with the names. Typically, a query provides a particular domain name and describes the type of resource information that is desired. A domain name can identify a host in the Internet and the resource information held refers to its address.

Name Servers are the repositories of information that make up the domain database. In general, a name server maintains complete information about a subset of the domain name space and pointers to other name servers that can be used to lead to information from any part of the domain tree.

Resolvers are programs that extract information from name servers in response to client requests. User programs interact with the domain name space through the resolver, which must be able to access at least one name server. A resolver uses that name server to resolve the query directly or it may need to pursue the query across several foreign name servers in order to provide an answer to the user.

The two-level updating described above has been discussed as a development of the first aspect of the invention.

However, the idea of using the address of the local name server as the care-of-address within the home name server may be considered a second independent aspect of the present invention.

Thus, in the second aspect, the present invention may provide a method of operating a network, the network comprising a plurality of interlinked domains, each domain having a name server associated therewith, each domain having at least one subnet, wherein:

a mobile terminal is first associated with one of said domains and a first subnet within said one of said domains, the name server of said one of said domains storing a name for said mobile terminal and an address of said mobile terminal, which address includes an identification of said first subnet, whereby the input of said name for said mobile terminal causes said name server said one of said domains to output said address;

when said mobile terminal moves to a second subnet associated with a second one of said domains, the name server of said second one of said domains stores said name for said mobile terminal and another address for said mobile terminal, which another address includes an identification of said second subnet, and said name server of said one of said domains stores said name of said mobile terminal and an address of said name server of said second one of said domains, whereby the input to the network of said name for said mobile terminal causes the name server of said one of said domains to output the address of said name server of said second one of said domains, and causes said name server of said second one of said domains to output said another address.

Preferably, when said mobile terminal moves to a third subnet associated with said one of said domains, said name server of said one of said domains changes said address of said mobile terminal whereby said changed address includes an identification of said third subnet.

It is also preferable that when said network terminal moves to a fourth subnet associated with said second one of said domains, said name server of said second one of said domains further changes said another address of said mobile terminal, whereby said further changed address includes an identification of said fourth subnet.

The above two aspects also relate to a network arranged to operate in accordance with the above method.

As has been mentioned previously, different networks have different mobility management schemes. The first and second aspects of the present invention were concerned with mobility management within the Internet. The Internet uses names to identify particular terminals. For mobile telecommunications devices, such as wireless telephones, telephone numbers are used, which follow the E.164 specification of the International Telecommunications Union. In the third aspect of the present invention, cellular telephone domains have name servers associated therewith, in the same way as Internet networks. As for the Internet, the name servers define a domain over which they have authority and provide coverage. The domain servers are accessible by all networks, and are identified by a suitable address. When the domain is a cellular telephone domain, the E.164 number forms the name of the mobile telecommunications device within that domain. Where the domain is an Internet domain, the name is the normal Internet one. Each name server then associates with the name a permanent address and a temporary address. The temporary address may be the current care-of-address of the terminal, or may be the address of another name server, which holds the current care-of-address. Thus, by providing name servers associated with cellular telephone domains, having an addressing system corresponding to that of the first aspect, but provided across all types of domains, a global communication system across different networks can be achieved.

BRIEF DESCRIPTION OF THE DRAWINGS

Embodiments of the present invention will now be described in detail, by way of example, with reference to the accompanying drawings, in which:

FIG. 15 shows the structure of an IPv6 address;

DETAILED DESCRIPTION

The First Embodiment

The first embodiment of the present invention will now be described, being an Internet communication system.

In the Internet, users typically supply applications with a destination's name rather than an address. Applications then need to resolve the name to an address by sending a query to a name server, which responds with the translation to an address. Upon receipt of the address, transmission of traffic to that address can be initiated. Generally, the name server stores the mapping from name to permanent address for a host. The proposed approach is to modify the name server such that it not only stores the permanent address of a host but also its care-of-address, indicating current location of a mobile terminal (hereinafter "mobile"). A query to the name server would then provide an application with an address identifying its current point of attachment and packets can be sent directly to the host, bypassing the home subnet. A more optimal route can be used.

Figure 1:
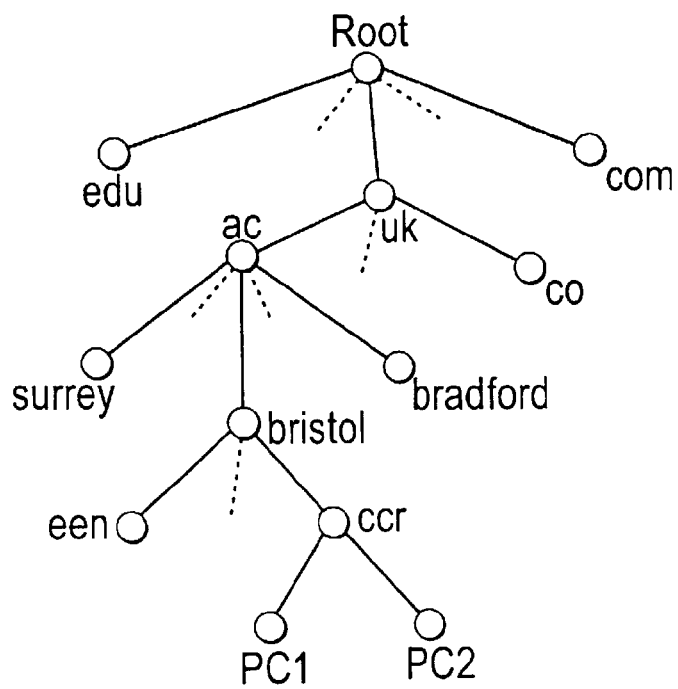
FIG. 1 is a tree diagram showing an Internet naming hierarchy.
Figure 2A:
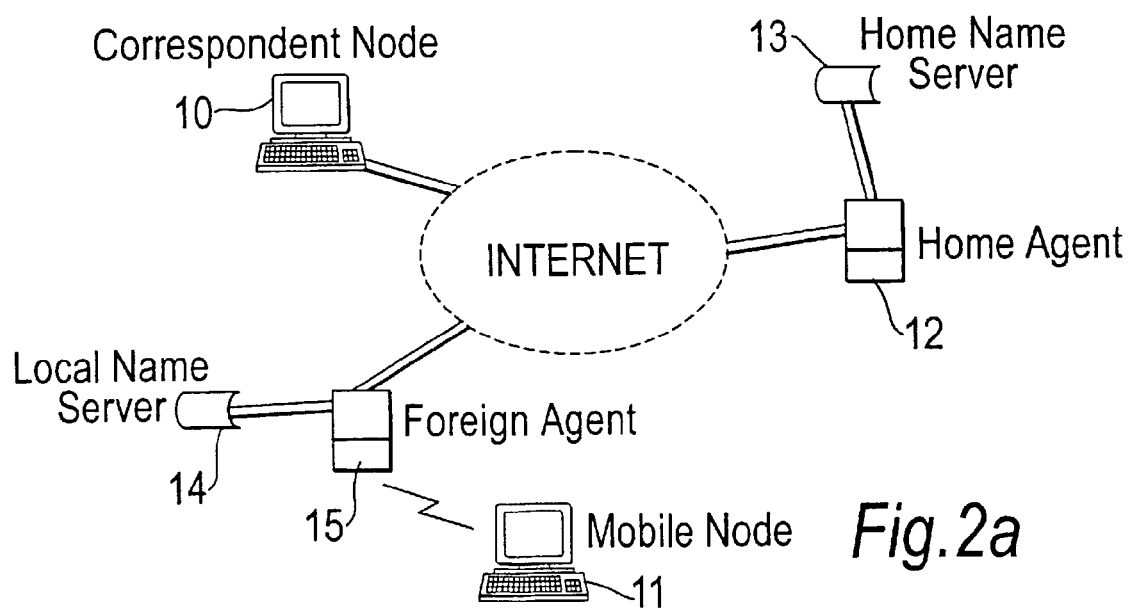
FIGS. 2a and 2b are a schematic network diagram showing the movement of terminals in an Internet network.

The Domain Name System, more specifically the name servers, provide a suitable structure of databases, where a name server can be used for similar purposes as the home location register and the visitor location register. The Domain Name System partitions names into several hierarchically organised domains, where the hierarchy can span arbitrarily many levels. Every name server is responsible for a subtree of the name space corresponding to a domain boundary or zone. Each server may further delegate part of the name space to other servers. For example, consider a hierarchical tree as shown in FIG. 1. The name server at level bristol.ac.uk may assign responsibility for names ending with ccr.bris.ac.uk and een.bris.ac.uk to different servers. Then, the name server for the ccr domain can be seen as functioning as the home location register of PC1 whereas the name server for the een domain would function as a visitor location register if PC1 roamed to that subnet. Consider now the simplified Internet shown in FIG. 2a. In FIG. 2a, a correspondent node 10 seeks to communicate with a mobile node 11. The home agent of the mobile node is shown at 12, and the home name server of the mobile node 11 at 13. In the situation envisaged by FIG. 2a, the mobile node has moved from its home network to a foreign network, which foreign network has a foreign name server 14 controlled by a foreign agent 15.

The operation of the proposed protocol is as described below. Every host has a permanent IP address, which identifies its home subnet. Two entities are required, namely the home agent and the foreign agent, which are routers in the home and foreign subnets respectively. The name server in a home subnet has a record for every fixed and mobile host registered within that subnet. Given that the name servers have to maintain location information, the structure of the resource record should include fields identifying a temporary address and the type of the temporary address. The type could be a host address or a pointer to another part of the domain name space. Therefore, at least the following fields are required:

Name of host
Permanent IP address
Type of permanent address
Temporary address
Type of temporary address
Lifetime of entry DNS operations are then required, which enable updating the temporary address, the type field and the lifetime field given the name of the mobile node or its permanent address. A query to the name server should also result in the temporary address being returned rather than the permanent address if there is a valid temporary address in the server.

The first embodiment requires additional flags and sub-options in the binding update. The structure of the binding update is based on that used in Mobile IPv6 but a number of additional flags and options are required.

A binding update is a packet with a source and destination. The various fields in the binding update indicate the lifetime of the binding, its sequence number, flags giving extra information and also a number of sub-options, which allows extension of the information transferred in the packet. In Mobile IPv6, the source of the binding update is usually the care-of-address of the mobile so that the care-of-address need not be specified in the content of the packet. In the DNS-based protocol, this is not always the case and one of the sub-options always has to be reserved to carry the care-of-address of the mobile node. A sub-option is also required to supply the address of the home agent—this is only needed when the foreign agent is expected to send a binding update to the home agent. More sub-options may be needed to inform the current foreign agent of the address of the previous foreign agent and the first foreign agent. The concept of a first foreign agent will be explained later. Depending on the definition of the operations on resource records, the name of the mobile node may have to be supplied to aid in identification of the record to be updated and it would have to be given as a sub-option.

Also, the care-of-address supplied in the binding update can be of 2 types, as will be explained later. It can be the actual care-of-address of the mobile terminal or it can be the address of a local database. A flag is required to indicate the type of care-of-address held in the binding update—this flag is referred to as the T flag. When set to 1, the T flag indicates that the care-of-address is an actual host address and when set to 0, it shows that a database address is being provided.

Depending on the information supplied by the binding update, different types of binding updates can be identified serving different purposes. In particular, four types can be distinguished namely local registration, global registration, redirection and de-registration.

A local registration binding update is a binding update sent to the foreign agent to request registration in the current domain where the mobile node is. The source is the mobile node and the destination is the foreign agent.

A global registration binding update is one destined for the home agent to request location updating in the home domain of the mobile node. The initiator of the update can be the mobile node or the foreign agent.

A redirection binding update is an update that is sent to the previous foreign agent when a mobile node moves under the coverage of a new foreign agent. The mobile node may send the update itself or may request the new foreign agent to do so. This ensures that any packets sent to the previous domain are forwarded to where the mobile node is.

A de-registration binding update is an update that informs the agent that receives it that the mobile is no longer registered in the domain. This is achieved by setting the lifetime of the binding update to be equal to zero. If the mobile has returned home, it de-registers with its home agent by sending a binding update with the source set to its permanent address and the home registration bit set.

A binding acknowledgement is usually sent back to the initiator of a binding update to indicate whether processing of the binding update has been successful or not. Typically, a status value less than 128 shows that the binding update has been accepted by the recipient and so far only status value 0 has been defined. Other status values defined in Mobile IPv6 are greater than or equal to 128. The DNS-based protocol requires definition of another status value that indicates successful processing of the binding update but provides more information as to whether a mobile is moving into a domain for the first time or not. Status value 1 has been defined for that purpose. The use of these status values will be explained later.

Figure 3:
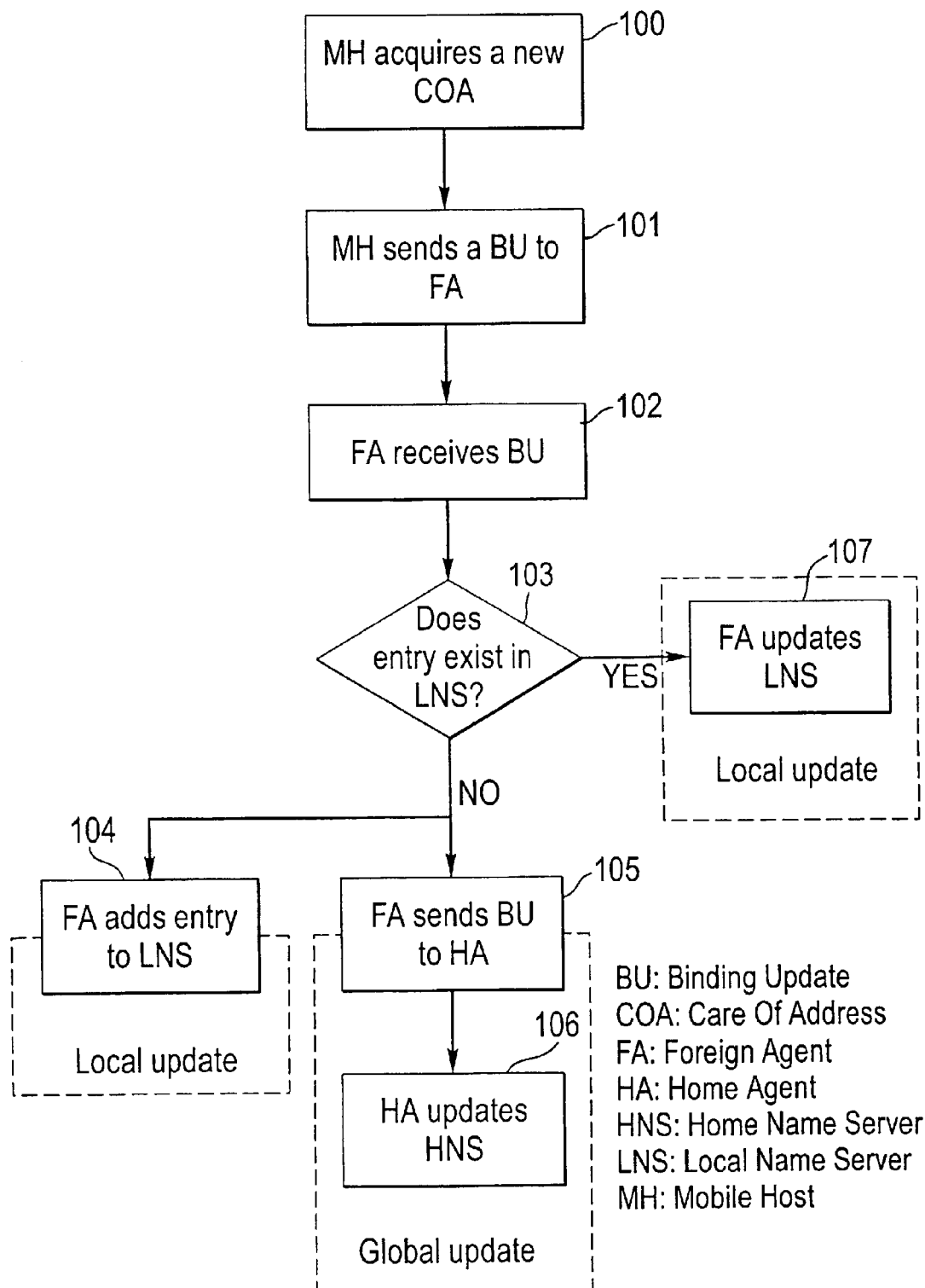
FIG. 3 is a flow chart during the location updating procedure used in the arrangement of FIG. 2.

An additional sub-option is also required in the binding acknowledgement, where depending on the mechanisms used for registration, the mobile node may need to be informed of the address of the local name server. The operation of the first embodiment will now be discussed. Following movement detection, a mobile node has to form a new primary care-of-address using one of the on-link subnet prefixes advertised by the new router. This is illustrated in FIG. 3. As in Mobile IPv6, the mobile node may use either stateless or stateful address autoconfiguration. Given that foreign agent functionality has been introduced again, there is the possibility for the foreign agent to allocate a care-of-address to the mobile node, as was the case in Mobile IPv4, as illustrated in FIG. 3.

After acquiring a primary care-of-address (step 100 in FIG. 3), the mobile node needs to initiate procedures for registration and location updating. In the first embodiment, the mobile has to create and send 101 a binding update to the home agent, informing it of its new point of attachment. Upon receipt of the binding update, the home agent needs to validate it to determine the type of binding update and ascertain that it really is from the source specified in the packet. Then, besides keeping a record of the binding, the home agent is now also responsible for updating the home name server within that subnet. The care-of-address field of the record corresponding to the mobile is updated accordingly. This takes care of the mobile tracking phase. Note that if the mobile node returns to its home subnet, it has to de-register with the home agent and does so by sending a binding update with the source being its permanent address and the home registration bit (H) set.

If the foreign agent was involved in the process of address allocation, it may register the arrival of the mobile node in the local name server, which adds an entry relating to that host. This update ensures that if any host within that subnet wishes to communicate to the mobile, a query to the name server can be resolved locally, thus minimising the traffic generated.

A binding update is associated with a lifetime so that at the end of that period of time, if the binding is still valid, it must be renewed. At the same time, this will lead to renewal of the lifetime of the corresponding entry in the name server.

Therefore, the mobile node should keep track of its binding with the home agent and at expiry, it has to send another binding update in order to renew it. The home agent then updates the home name server accordingly.

In other words, a binding update is initiated whenever
a mobile node changes its primary care-of-address and
the mobile node renews its binding with the home agent.

If the binding is not renewed, it expires, after which the home agent no longer performs that role for the mobile node. At the same time, the name server entry expires and the resource record has to be deleted unless the name server is authoritative for that host. The authoritative server remains the name server in the home subnet of the host and after expiration of the time to live, the care-of-address is set back to the permanent address of the host.

When a user needs to launch an application that connects to another terminal (fixed or mobile), the application will typically be supplied with the name of the terminal rather than the address. This results in a query being launched to the name servers. The resolver tries to find an answer locally, failing which it needs to pursue the query to other name servers. The response to the query now does not give the permanent address of the host but the care-of-address held in the record. If the destination is fixed or if it is mobile but roaming at home, the care-of-address field would have been set to be equal to the permanent address in the name server.

Once a user program obtains the address of the terminal it needs to communicate with, it can initiate transmission of packets using that address. Routing takes place in the normal way irrespective of whether the destination is fixed or mobile. If the destination is a mobile host currently in a foreign subnet, the address should indicate the mobile's current point of attachment and packets can be routed directly, thus bypassing the home network. The protocol as defined avoids the initial triangular routing, which still features in Mobile IPv6.

In order to ensure that handover between routers is smooth, two possibilities can be considered. The correspondent host or the caller can regularly query the DNS to determine if the host has moved. Such an approach would generate a high load of traffic and unnecessary queries to the name servers especially if the mobile is slow-moving or fixed. Note that an IP address does not distinguish between a fixed and a mobile host. This would also imply regular and frequent tearing and establishment of TCP connections.

The second approach is to use similar features as in Mobile IPv6. When a mobile roams from a foreign subnet to another, it notifies its previous default router, that is the foreign agent, as well as the home agent of its new location.

The previous foreign agent can intercept any packets destined for that mobile and can tunnel them to its current location. When the mobile detects that it is receiving packets that are being forwarded, it can also send a binding update to the correspondent node, which can use its care-of-address for any subsequent transmission, thereby ensuring optimal routing.

As in Mobile IPv6, when the mobile node wants to update its location with an entity in its home network, it may not know the address of a home agent. Therefore, it sends its binding update to a home-agents anycast address constructed with the prefix identifying the home network of the mobile. One of the home agents with this address rejects the update and replies to the mobile providing its own global unicast address and a list of unicast addresses for possible home agents. The mobile can then choose one, to which it sends a binding update for registration. This home agent updates the home name server as required.

The embodiment as described above provides a means for eliminating the sub-optimal routing as packets destined for a mobile node no longer have to be transmitted to the home subnet before being tunnelled to the mobile. The feature of triangular routing is eliminated completely. However, the scheme inherits the drawbacks of Mobile IPv6 in terms of the signalling traffic generated for location updating. Every time the mobile changes its point of attachment, a binding update is generated, which may generate a considerable load on the network where there are a lot of mobile terminals moving and changing addresses frequently.

The Second Embodiment

In order to alleviate the problem associated with the signalling traffic, it is possible to exploit the distributed and hierarchical structure of the Domain Name System. The second embodiment relies on the fact that each name server has authority over a particular domain and the home name server need not maintain a record of the care-of-address of the mobile but merely a pointer to the local name server. Therefore, two types of location updates are introduced: global update and local update. A local update refers to a binding update sent to the foreign agent whereas a global update is one that is sent to the home agent. The second embodiment thus has 2-level updating whereas the first embodiment has 1-level updating. The location management procedure will now be described.

Movement detection is carried out in the same way as outlined for the first embodiment and the mobile node acquires a care-of-address using similar mechanisms as described for the first embodiment.

When a mobile moves away from its home network and acquires a care-of-address, two types of registrations and location updating follow. The mobile node creates and sends a binding update to the foreign agent, supplying its care-of-address. If the foreign agent allocated that care-of-address, it is already aware of it. The foreign agent then updates the local name server where an entry is added or updated recording the care-of-address of the mobile node. This is referred to as a local update. If the mobile node moved into that domain for the first time, there is no entry for it in the name server and a new entry is added. Otherwise, the existing entry is updated.

In the case where the mobile moves into a domain for the first time, a global update is also required whereby a binding update is sent to the home agent. However, instead of being an association between the permanent address and the care-of-address of the mobile, the binding update is now an association between the permanent address of the mobile and the address of the local name server. The home agent then updates the home name server, which maintains a record of the local name server where the actual address of the mobile is held. There is a requirement to indicate the type of care-of-address that is held in the binding update, thereby the use of the T flag. The home agent is then able to update the name server by specifying whether the care-of-address is an actual host address or a pointer to another name server. The entity that initiates a global update can be the mobile node or the foreign agent. Mechanisms to use both will be described later.

Once a global update has been done, as long as the mobile moves within the domain that falls under the authority of the local name server, only local updating is required if it changes its care-of-address. The home agent is updated only if the mobile moves to a different domain.

In the 1-level updating case of the first embodiment, management of the binding update and its renewal was easy, as only one binding has to be updated for each mobile node. In the 2-level updating case of the second embodiment, there are two bindings that require management, the local one and the global one. Management of the local entry can proceed in a similar way as in scheme 1 where the actions required between the mobile node and the home agent now apply between the mobile node and the foreign agent. Therefore, the mobile node updates or renews its current local binding whenever a) it changes care-of-addresses and b) it detects that its local binding is about to expire.

Management of the global entry is trickier. The lifetime of an entry for a mobile node in the home name server cannot be equal to the lifetime of its corresponding entry in the local name server. It has to be considerably greater for it to remain valid while the mobile host is roaming across a local domain and no global updating is required. The questions that arise are how to ensure that the entry in the home name server remains valid as long as it has to and who manages the lifetime of the global binding.

There are 2 entities that can assume that responsibility, namely the mobile node itself or the foreign agent. Whichever entity does it, the key in the solution is the introduction of another status value in the binding acknowledgement, which is status value 1. Status value 1 indicates that a binding update has been successfully processed and also provides more information. When a foreign agent receives and processes a binding update, it decides if a global update is necessary. If yes, it acknowledges the binding update with status value 1, which allows the mobile node to know that it is moving into this domain for the first time. The mobile node may need to keep a record of the address of this foreign agent, referred to as the first foreign agent. If a global update is not required, that is the mobile node has not moved across domains, the foreign agent sends a binding acknowledgement with status value 0. The values 0 and 1 are used provided the binding update is processed successfully.

The introduction of an additional status value enables the mobile node to know whether it is moving in a different domain or remaining in the same one when it changes addresses. If the mobile node is taking care of managing the global binding, it then knows when to initiate a global binding and can monitor its lifetime. If the foreign agent is responsible for updating the global binding, the mobile node is aware of the foreign agent that is doing so.

When a correspondent node sends a query to the home name server to determine the address of the mobile, the query is referred to the local name server. If the home name server is operating in recursive mode, the query is pursued to the local name server and eventually the care-of-address is returned to the correspondent node. If not, a referral to the local name server is sent back to the resolver at the correspondent node and another query to the local name server is required to obtain the care-of-address of the mobile node.

Of course, the correspondent node always checks its local cache for an entry related to the mobile node before addressing a query to the home name server. Once the correspondent node obtains the care-of-address of the mobile, routing of packets is done directly to the mobile as in the first embodiment. Again, sub-optimal routing has been eliminated completely.

The same mechanism used in the first embodiment to ensure smooth handover is applied in the second embodiment and dynamic home agent discovery may be used in the same way as described in the second embodiment.

Besides still ensuring optimal routing, this embodiment essentially reduces the number of binding updates that are sent to the home agent and hence the associated traffic in the network. The home name server keeps track of mobiles to a higher level of granularity whereas the local name server is responsible for maintaining more accurate addresses for the mobile terminals. Therefore, this approach localises the signalling traffic, which is especially efficient when the mobile terminal does not move across domains frequently.

In the 2-level updating case of the second embodiment, there are two entities that can initiate global updating and take care of managing the global bindings. They are the mobile node and the foreign agent.

Figure 2B:
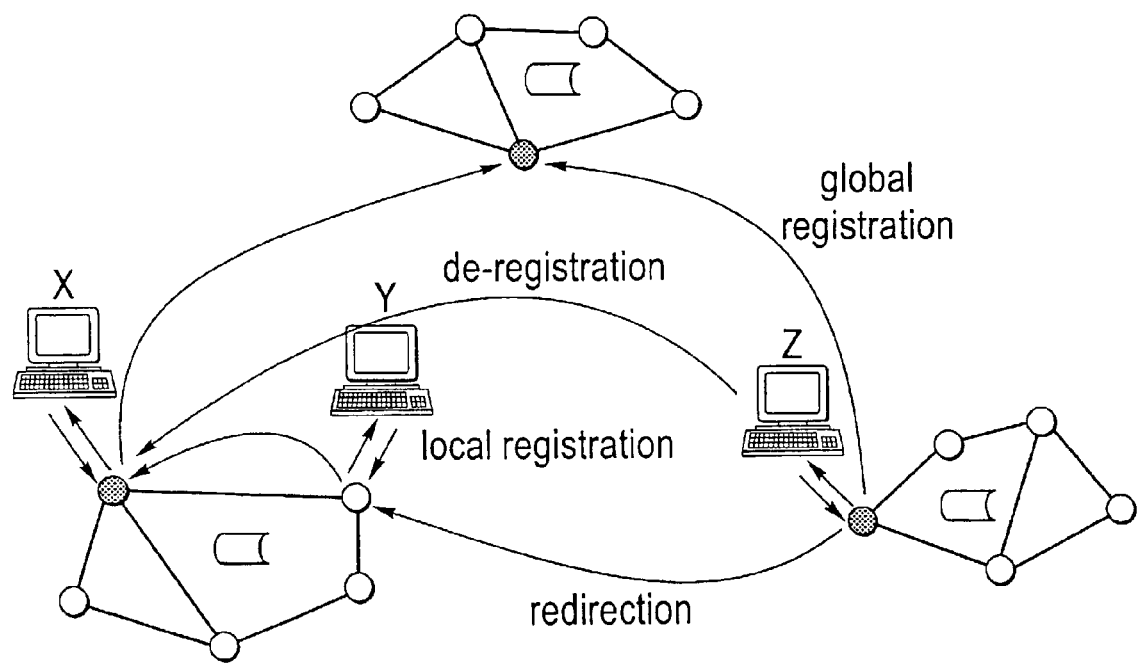

In the mechanism used, the foreign agent is responsible for creating and updating the global binding. The sequence of actions as the mobile node roams from foreign agent to foreign agent within and across domains is outlined below. The mobile node is assumed to move point X to Y and finally to Z in FIG. 2b. FIG. 2b illustrates the sequence of binding updates when a foreign agent manages the global binding. Note that the first foreign agent that the mobile attaches to when it moves into a domain for the first time is termed first foreign agent.

1. When a mobile detects that is has moved (at point X), it needs to initiate a local registration. The mobile supplies the address of its home agent as a sub-option in the binding update. The foreign agent finds that the mobile was not registered in this domain previously and sends a binding acknowledgement with status value 1 to the mobile node. This foreign agent is the first foreign agent for the mobile node in that domain. The foreign agent inserts an entry corresponding to the mobile in the local name server.

2. Upon receipt of the acknowledgement, the mobile node keeps a record of the address of the foreign agent as its first foreign agent in the domain.

3. The foreign agent also has to initiate a global registration where a binding update is sent to the home agent and is responsible for keeping track of when this binding is expiring. The home agent updates the home name server after processing the binding update.

4. The mobile node now moves to point Y and attaches to a new foreign agent, which acknowledges the local registration binding update with a status value of 0. This informs the mobile node that it has not moved across domains. Only the local name server is updated.

5. The mobile node then initiates or requests the new foreign agent to send a redirection binding update to the previous foreign agent, which in this case is also the first foreign agent. In order for the new foreign agent to do that, it needs to know the address of the previous foreign agent, which the mobile node may supply as an additional option in the binding update.

6. The first foreign agent then knows that it has to forward any packets received for the mobile node to the new point of attachment but it is still in charge of managing the lifetime of the binding update.

7. The mobile node then detects that it has moved to point Z and registers again. As a result, it receives a binding acknowledgement with status value 1, which shows that the mobile is now in a new domain and this foreign agent is acting as its first foreign agent.

8. The mobile ensures a redirection binding update is sent to the previous foreign agent. This could be done by the current foreign agent.

9. The mobile now also has to send a de-registration binding update to its previous first foreign agent to inform it that it need not manage the global entry. The new first foreign agent assumes responsibility for sending a global update to the home agent and monitoring the lifetime of the global entry. The home agent updates the home name server accordingly. The mobile may also request the new foreign agent to send the de-registration binding update, in which case it needs to supply that address first. Again, this can be done as an additional option in the binding update.

10. As long as a first foreign agent does not receive a de-registration binding update, it keeps track of any global bindings it is responsible for and if they are about to expire, it renews the binding with the home agent. When it receives a de-registration binding update, the first foreign agent must take actions to delete any entries associated with that mobile terminal from the local name server.

In this arrangement, control is shared between the mobile node and the foreign agent. The global entry is updated a) when the mobile node moves into a new domain and the foreign agent initiates global registration b) when the first foreign agent detects that the global binding is about to expire and renews it.

If the mobile takes care of sending de-registration and redirection binding updates itself, this implies more binding updates are sent across the air interface, which is not desirable. Therefore, requesting the current foreign agent to do so is better but the mobile host has to supply it with the address of the previous foreign agent and the previous first foreign agent. These can be sent as additional options in the binding update that the mobile creates to register locally.

The following steps define the location updating procedure in the new protocol when two types of location updating are used and are illustrated in FIG. 3. Control of global updating and management of the lifetime of global bindings is shared between the mobile host and the foreign agent.

1. The mobile node 11 uses IPv6 Neighbour discovery as primary mechanism to detect movement, as in Mobile IPv6.

2. When it detects that its default router has changed (step 100 in FIG. 3), it needs to configure a new care-of-address. The mobile node 11 may use stateless or stateful address autoconfiguration to form a new care-of-address. The mobile node 11 may also use a care-of-address given by the foreign agent 15.

3. The mobile node 11 needs to register this new care-of-address locally and with its home agent 14. It sends a binding update (step 101) (BU) with the following fields set as shown to the foreign agent.
 Option: binding update
 Source: care-of-address of mobile node 11
 Destination: address of foreign agent
 Care-of-address: care-of-address of mobile node 11
 T flag bit: set (host address)
 Home address option: permanent address of mobile node 11
 Lifetime: time duration for which this update is valid
 Additional option required: name of mobile node 11
 Additional option required: address of home agent
 Additional option required: address of previous foreign agent
 Additional option required: address of previous first foreign agent (may be left as null if the mobile does not have any)

4. The foreign agent 15 receives the binding updates (102) and processes them in the following way.

5. The foreign agent 15 sends a query (103) to the local name server to find out if a record of the mobile node is held in the database. The recursion desired (RD) bit should not be set in the query to ensure that the query is resolved locally and no recursion is carried out.

6. If there is no entry in the database, the result sent back to the foreign agent is a name error or a referral to another name server. The foreign agent then adds an entry (104) in the name server, giving the following information:
 Name of mobile node
 Permanent address
 Care-of-address
 Type of care-of-address (host address)
 Lifetime.
 This is a local update.
 The foreign agent 15 sends a binding acknowledgement to the mobile node with status value set to 1.
 The foreign agent 15 then sends a binding update (105) to the home agent with the following fields:
 Source: address of foreign agent
 Destination: address of home agent or home-agents anycast address
 Care-of-address: address of local name server
 T flag bit: not set (name server address)
 Home address option: permanent address of mobile node
 Lifetime: time duration for which this update is valid
 Additional option: name of mobile node
 This is a global update. Again, if a home-agents anycast address is used, the foreign agent 15 sends the binding update to a home agent after it receives the addresses of possible home agents.

The foreign agent also creates and sends a redirection binding update to the previous foreign agent. The fields are set as shown:
 Source: address of foreign agent
 Destination: address of previous foreign agent
 Care-of-address: care-of-address of mobile node
 T flag bit: set (host address)
 Home address option: permanent address of mobile node
 Lifetime: time duration for which the update is valid The foreign agent has to inform the previous first foreign agent that it no longer needs to manage the global binding. It sends a de-registration binding update to it with the following fields.
 Source: address of foreign agent
 Destination: address of previous first foreign agent
 Lifetime: 0

7. If there is an entry in the database, the foreign agent sends an update (107) to the local name server in order to update the care-of-address and the lifetime of the entry. This is a local update. The foreign agent also sends a redirection binding update to the previous foreign agent with the fields set to the values shown in point 6.

8. When the home agent receives a binding update, it processes it in the following way—it keeps a record of the binding and sends an update (106) to the home name server giving it the Name of the mobile node
Permanent address
Address of local name server
Type of temporary address (name server address)
Lifetime of entry.

9. The temporary address, type of address and time to live (lifetime) fields are then set to the values provided.

The first foreign agent renews the global binding whenever it detects that the binding is close to expiry.

Thus, when a correspondent host wants to communicate to a host (mobile or fixed), the application will typically be supplied with the name of the host. If the application is supplied with the address of the host and this host is mobile and has moved away from its home network, the correspondent host will eventually be informed of the address of the mobile node via Mobile IPv6 operation. If a name is supplied, a query is launched to the name server to resolve the query. If an entry exists in the local name server the query can be resolved locally without accessing the home name server. Otherwise, the query is sent to the home name server. The address to be returned as part of a response is the temporary address of the node. This address may be a host address or the address of another name server.

Depending on whether the name server operates in a recursive mode or not, the query may be pursued further or the address held is sent back to the correspondent host. If the address held is a pointer to another name server, a query is launched to that name server. This process is repeated until the host address is obtained.

Where 2-level location updating applies, as in the second embodiment typically, the response from the home name server 13 is a pointer to the address of the local name sever 14. Another query to the local name server 14 is required for the correspondent host to obtain the address of the node.

When the correspondent node 10 obtains the care-of-address, communication between the two nodes 10, 11 can start. All communication follows an optimal route, bypassing the home agent 12.

All three mobility management protocols, Mobile IPv4, Mobile IPv6 and the approach of the present invention may be simulated in JAVA, using a client-server, object-oriented approach based on CORBA. Each simulation enables creation of a network topology, which consists of a number of routers and end users. The end users can be fixed or mobile. Each router identifies a subnet in which the end users reside. A two-level addressing is being used in the current implementation so that the address of an end user is composed of a subnet id and a node id. The subnet id represents the subnet to which the end user belongs, in other words the router to which it is connected. The node id distinguishes between different end users in the same subnet. An end user, fixed or mobile, is assigned a permanent address which does not change during the course of the simulation. Mobile end users are allowed to move according to a predefined trajectory, specified in terms of speed, direction and duration of motion. End users can also be involved in packet transmission.

The name server for the first or second embodiments described above may be implemented as a database. The name server can be centralised or can be distributed according to a two-level hierarchy. In the latter case, at the lowest level, a name server can be responsible for a number of subnets, which constitute a domain. At the higher level, the root name server maintains information about the lower level name servers. As opposed to a traditional name server, which mainly keeps a record of the name and permanent address of a host, the one used in the simulation holds details of the name, permanent address and care-of-address of a host. In the case of a fixed host or a mobile host which is in its home subnet, the care-of-address is set to be equal to the permanent address.

The performance of each approach has been evaluated with respect to the optimality of routing and the amount of signalling traffic generated. The simulation keeps record of the number of packets that arrive at their destination, the number of hops they take to so and the number of signalling messages generated at regular intervals. Routing efficiency is measured in terms of the average number of hops required for packets to reach their destination as the destination is allowed to move. Note that this assessment is not trying to determine the optimality of the routing algorithm. A minimum-distance fixed routing algorithm is used throughout the simulation and is itself judged to be optimal. However, the path that packets take to go to their destination depends on the information that the source holds regarding the location of the destination. Therefore, the analysis is aimed at determining the efficiency of the mobility management scheme, which affects the optimality of routing in the network.

In this evaluation signalling traffic may consist of any messages sent in relation to mobility and also queries to the name server. Therefore, signalling messages include binding updates, binding acknowledgements, queries to, updates to and replies from the name server. The signalling load is measured as the number of signalling messages where each message transmitted across a hop is counted as one message. Therefore, if a signalling message generated by an end user takes 4 hops to reach for example the home agent, 4 messages will be recorded. This definition is used in order to take into consideration not only the mobility of users but also the reachability of the home agent or the correspondent host from the location of the mobile user. It also takes account of the distance of the name server from the home and foreign agents in terms of connectivity.

Figure 4:
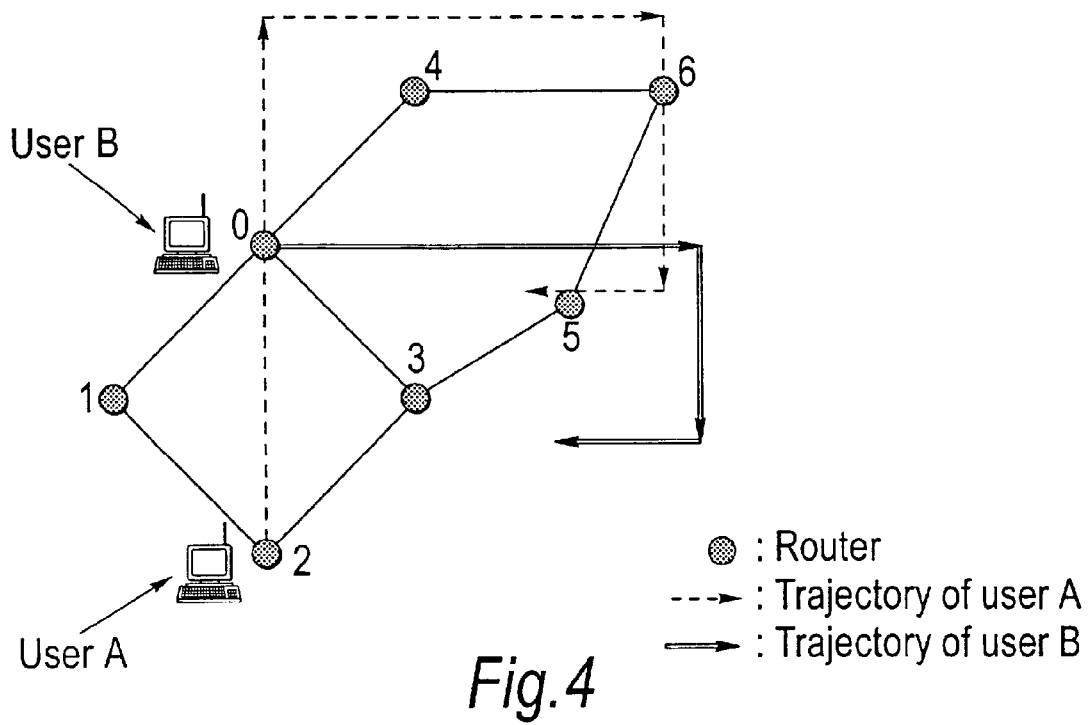
FIG. 4 is a schematic diagram of a network involving 7 routers.

The results to be discussed have been obtained for the network topology shown in FIG. 4. Only the routers are shown but each router has a number of end users within its subnet. Communication to an end user is achieved via the router to which it is connected. At the start of a simulation, all mobile end users are in their home subnet. If a mobile user subsequently moves during the course of the simulation, it registers with different routers as it roams in different subnets. The point at which a mobile enters a different subnet is identified when the distance between the mobile and the new router is shorter than its distance from the router it is presently connected to. A central name server is used, which is located at router 0. This name server is the authoritative server for the entire domain and maintains records of name, permanent address and care-of-address for all users in the network.

The scenario used in the simulation is as such. A mobile terminal denoted by user A, attached initially to router 2 which identifies its home subnet, starts moving according to the trajectory shown by the dotted line in FIG. 3. A user connected to router 6 then initiates transmission of packets to the mobile user. Performance data is gathered when mobility management is carried out according to the three different protocols: Mobile IPv4, Mobile IPv6 and the proposed DNS approach. The data collected at regular intervals consists of the number of signalling messages generated within that interval, the number of packets which have reached their destination and the total number of hops required for these packets to arrive at their destination.

Figure 5:
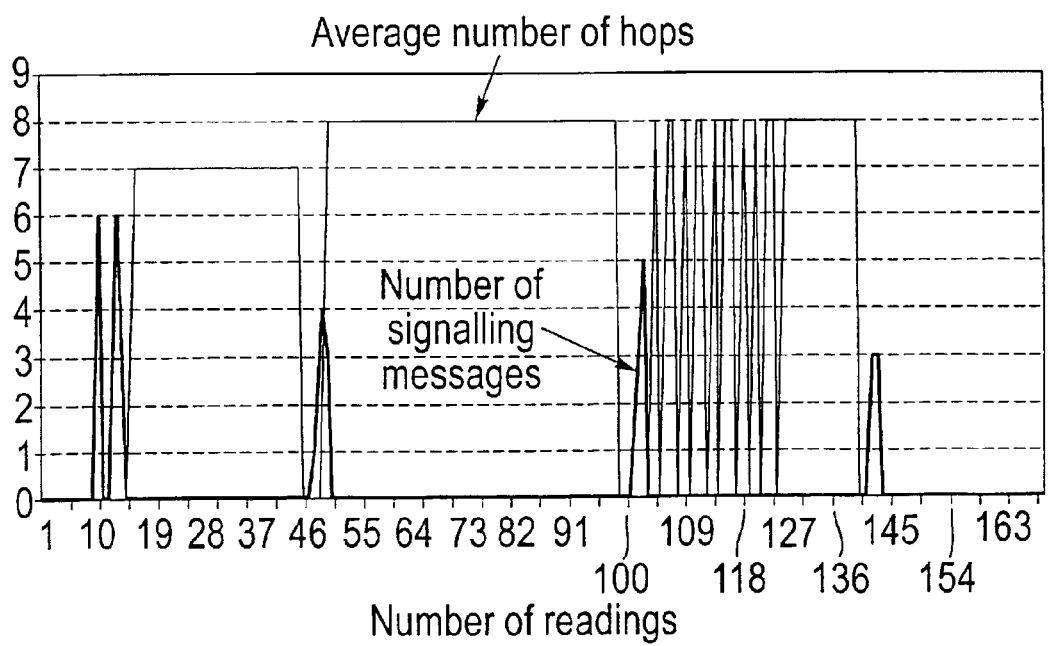
FIG. 5 is a graph showing results of use of Mobile IPv4 to the network of FIG. 4.
Figure 6:
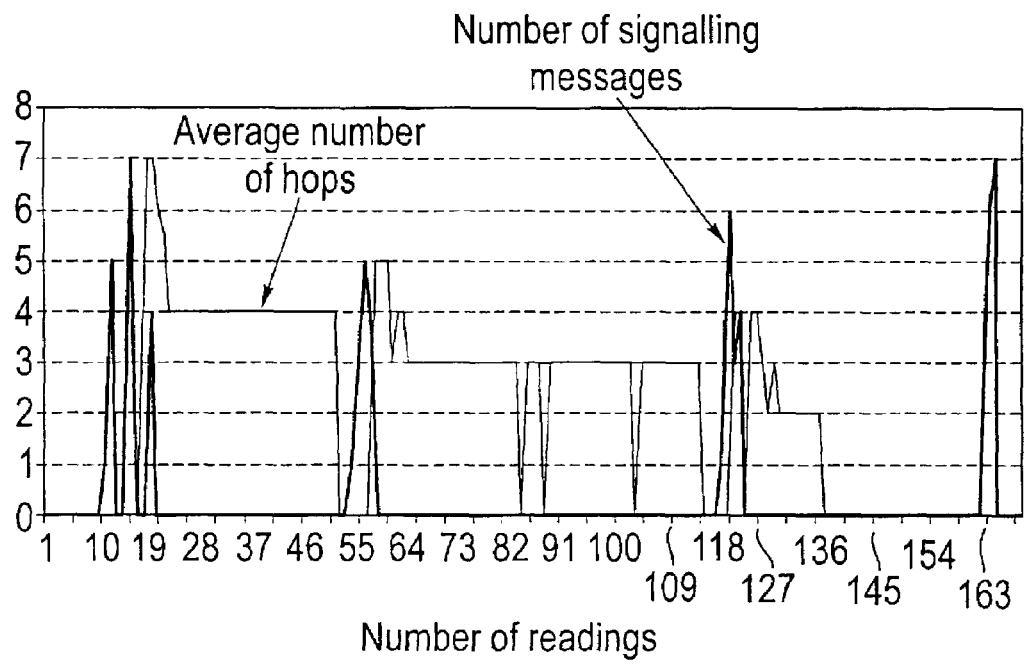
FIG. 6 is a graph showing the results of Mobile IPv6 to the network of FIG. 4.
Figure 7:
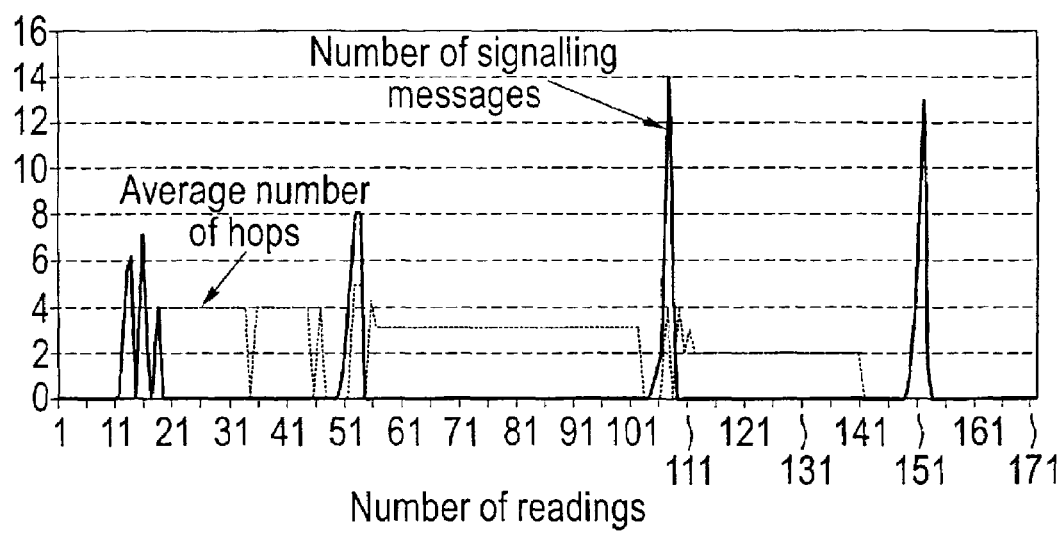
FIG. 7 is a graph showing the application of the first embodiment of the present invention to the network of FIG. 4.

The results obtained are as shown in FIGS. 5, 6 and 7. The x-axis represents the number of readings monitored during the simulation. Readings were taken at regular time intervals. The y-axis corresponds to the average number of hops or the number of signalling messages in accordance with the two graphs being plotted in one figure.

FIG. 5 shows the results obtained when mobility management is done according to Mobile IPv4. In FIG. 6, the graphs are derived from data collected when the mobility management protocol Mobile IPv6 is used. FIG. 7 shows results obtained when mobility management is carried out according to the embodiment of the invention described above.

A comparison of the three graphs shows that considerably more signalling traffic is generated in the case of Mobile IPv6 and the approach, of the first and second embodiments of the present invention. In effect, with signalling load as defined and upon application of the particular scenario described above, Mobile IPv6 shows a 65% increase in signalling load as compared with Mobile IPv4 whereas the DNS approach of the embodiment of the invention shows an increase of 132%. The increase in signalling load in Mobile IPv6 is due to the fact that binding updates are now sent not only to the home agent but also to the correspondent host. The approach of the embodiment of the present invention exhibits a 41% increase in signalling load as compared to Mobile IPv6. This arises solely because of the messages required to send updates to the name server. Given its definition, the signalling load is dependent on the location of the mobile with respect to its home network and the correspondent host. The further away the mobile is from both its home agent and the correspondent host, the more signalling traffic is generated. Signalling load is also dependent on the location of the name server with respect to the home agent and foreign agents. A centralised name server implies that more signalling traffic is generated if the home agent is far away in terms of connectivity from the server. A distributed architecture for the name server would alleviate the load due to access to the name server.

A second scenario has been investigated using one-level updating as previously described with reference to the first embodiment, whereby a user denoted by user B moves according to the trajectory shown by the double line in FIG. 4. User B's home router is router 0, which is also connected to the name server. This time, the approach of the first embodiment of the present invention generates about 37% more signalling traffic than Mobile IPv6.

The considerable increase in signalling traffic with the approach of the first embodiment of the present invention is due to the fact that when a mobile notifies its previous default router that it has moved, the router initiates an update to the name server it has access to. In the case of a centralised name server, the home agent has already sent an update to the name server but the foreign agent is unaware of this and sends an update too. This generates more updates than necessary when the foreign and home agents use the same name server, which is the case in the simulation for which results have been presented.

From FIG. 4, initially, packets from the source to the destination in subnet 2 require 5 hops including a hop from the source to router 6 and a hop from router 2 to the destination user. With the application of the scenario described above for user A, during the course of its trajectory, the mobile registers with routers 0, 4, 6 and 5 consecutively. In an ideal situation where the source is constantly aware of the location of the destination and packets always follow an optimal route, packets should reach the mobile after a maximum of 5 hops initially if the mobile is still at home. Subsequently, the number of hops is expected to be equal to 4, 3, 2 and finally 3 as the mobile changes its point of attachment in the network.

However, the optimality of the route taken depends on the mobility management protocol. In Mobile IPv4, the correspondent host is never informed of the location of the destination and always sends packets via the home agent. As a result, packets may take a minimum of 5 hops when the mobile is at home to a maximum of 8 hops when the mobile is in effect roaming in the same subnet as the source. In Mobile IPv6, the situation is improved given that as the mobile changes location, it sends a binding update to the home agent, its previous default router as well as the correspondent host. Still, initial transmission of packets assumes that the mobile is at home, which leads to packets being forwarded to their destination from router 2. The new approach that is being proposed eliminates the initial triangle routing so that provided the name server has been updated in time, packets are expected to reach their destination after a maximum of 5 hops.

In all three simulations, when packet transmission starts, the mobile has reached router 0. 200 packets were transmitted. The average number of hops required for a packet to arrive at its destination is summarised in FIG. 8 in which "DNS scheme" refers to the approach of this embodiment of the present invention.

Figure 8:
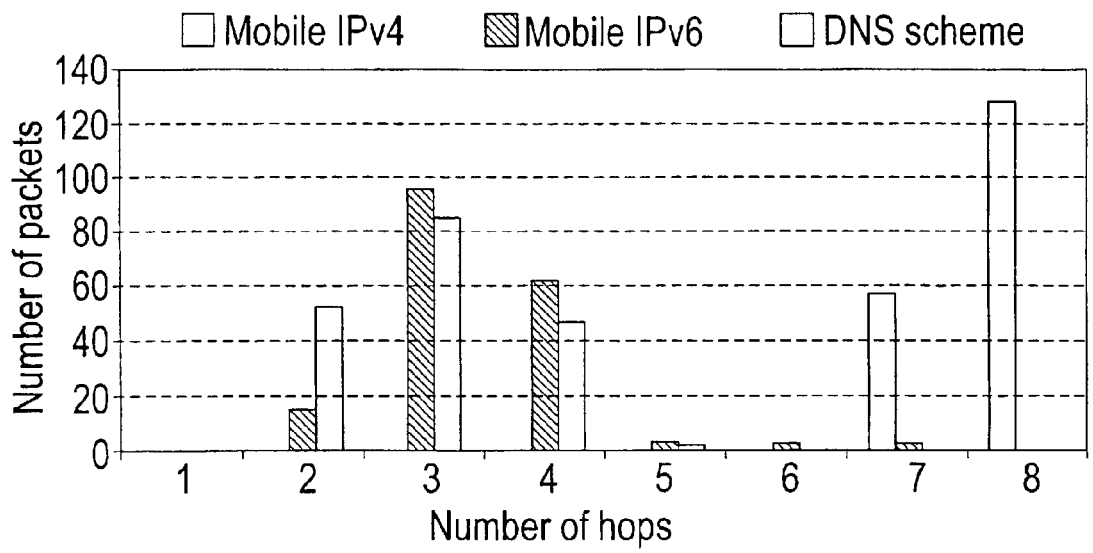
FIG. 8 is a graph comparing the number of packet hops in the three system described with reference to FIGS. 5 to 7.

From FIG. 8, in Mobile IPv4, all packets have taken an average of 7 and 8 hops to reach the mobile. Results for Mobile IPv6 show a relative improvement but as can be seen in FIG. 6, the initial packets transmitted require 7 hops. Subsequently, after the mobile sends binding updates to the correspondent host, an optimal route to the mobile's location is taken and the number of hops decreases. In the proposed DNS approach, packets are routed along an optimal path from the very outset so that they reach the mobile after only 4 hops. The few packets that take 5 hops are those that get forwarded to the mobile's new location from a previous default router. For example, when the mobile moves from router 0 to router 4, it informs router 0 of its new location and any packets that the correspondent host may have sent to router 0 are forwarded to router 4.

The following results have been obtained for a larger network consisting of 31 routers. The purpose of including those results is to illustrate how dependent the improvement achieved in the proposed scheme is on the location of the mobile with respect to its home network and the correspondent node. The effect of the location of the name server with respect to the home agent on the increase in signalling traffic will also be shown.

Figure 9:
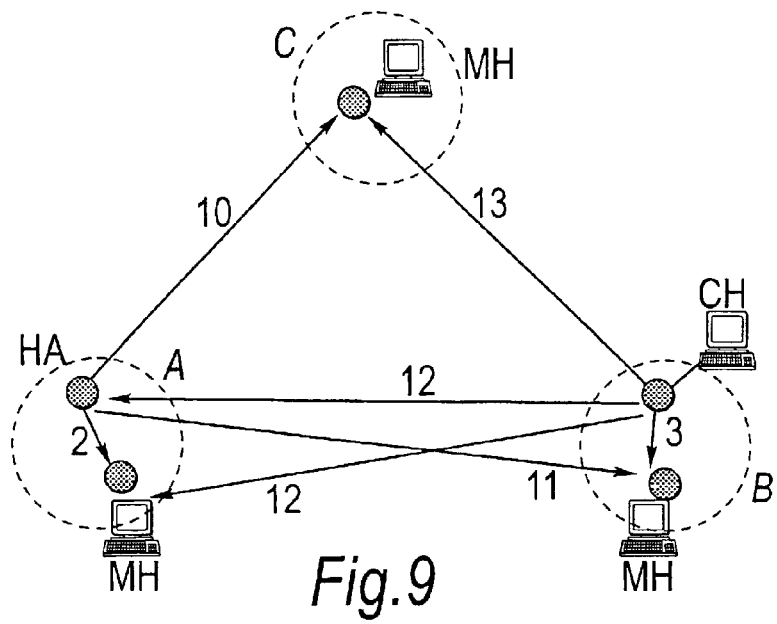
FIG. 9 is a schematic diagram of a network involving 30 routers.

The details of the network topology used in the simulation are not given but at a high level, the network can be viewed as consisting of three regions, A, B and C as depicted in FIG. 9. The home agent is assumed to be located in region A. The correspondent node resides in region C and does not move during the course of transmission of traffic. The number beside the link between two entities indicates the number of hops separating them.

Figure 10:
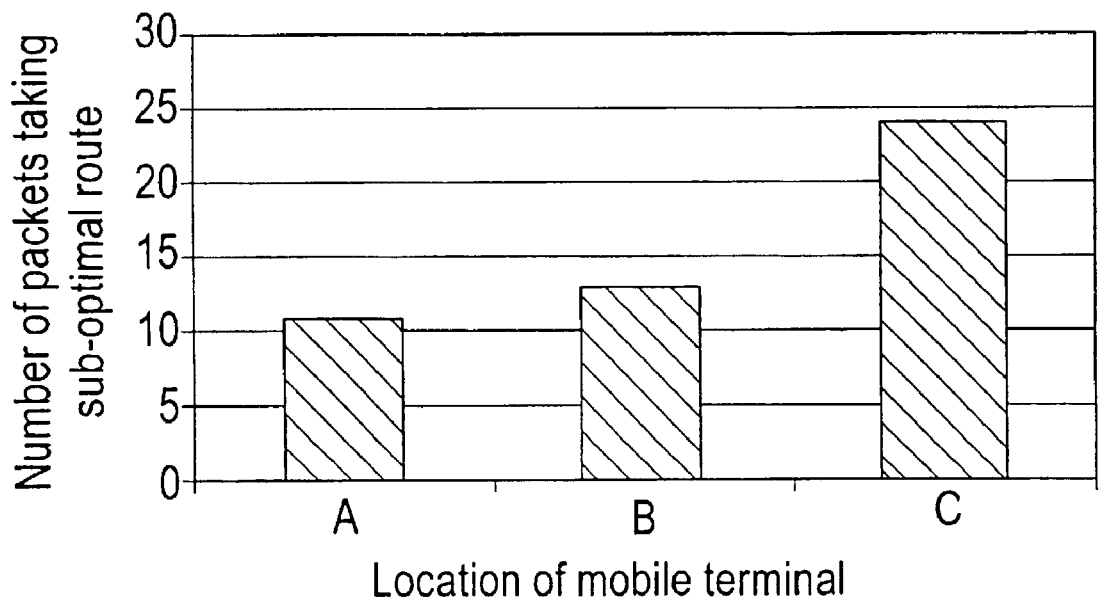
FIG. 10 is a graph showing the number of packets taking a sub-optimal route, in dependence on the location of a mobile terminal, in the first embodiment of the present invention.

Three cases are considered, in which the mobile terminal is located in each of the three regions. For example, in the first case, the mobile terminal is located in region A, 2 hops away from the home agent and 12 hops away from the correspondent node. Results are obtained when the mobility management protocol is based on Mobile IPv6 and on the approach of the present invention. This procedure is repeated for the cases where the mobile resides in regions B and C. The degree to which the approach of the present invention performs better is measured in terms of the number of packets that take a sub-optimal route to the mobile terminal when Mobile IPv6 is used. These packets correspond to the number of packets that are sent via the home agent before the correspondent node receives a binding update about the location of the mobile. The results are summarised in FIG. 10.

As can be seen, the number of packets that are transmitted to the mobile terminal via the home agent and therefore take a sub-optimal route depends on the location of the mobile with respect to its home network and the correspondent node. For example, when the mobile is located in region C, 24 packets are sent across the longer route constituting of 22 hops instead of a direct route of 13 hops. 11 packets follow a sub-optimal route of 14 hops when the mobile resides in region A. When the mobile is in region B, 13 packets take a route of 23 hops until the correspondent node receives a binding update that the mobile terminal is only 3 hops away.

The extra signalling messages required in the base Mobile IP scheme of the present invention may then be expressed in terms of the number of messages generated from the home agent to the name server. Note that one message traversing x hops is counted as x messages. Three cases are observed whereby the centralised name server is located in each of the regions. The number of extra signalling messages that are generated in each case are shown in the table below.

| Location of Name Server | A | B | C |
|---|---|---|---|
| Number of extra signalling messages | 2 | 11 | 10 |

The extra signalling traffic produced by the new mobility management protocol is therefore dependent on the location of the name server with respect to the home agent. In these simulations, a centralised name server has been assumed. The distribution of the name server is a factor that would have an impact on the signalling load associated with the proposed protocol.

Thus, the approaches of the first and second embodiments of the present invention outperforms Mobile IPv4, where routing is sub-optimal and there is no attempt at optimising routing at all. The new protocol performs better than Mobile IPv6 at the start of communication between two users because it eliminates the triangular routing. Mobile IPv6 still requires packets to be initially sent via the home network until the destination informs the correspondent host of its current location. The degree to which this is better than Mobile IPv6 depends on the relative distance between the correspondent host, the mobile host and the home agent in terms of connectivity. The distance between the mobile host and its home network determines how quickly the mobile receives packets from its home agent. The distance between the mobile host and the correspondent host then determines how quickly it can inform the correspondent host of its new location. The combination of the number of packets that follow a sub-optimal route and the time taken for the mobile host to notify the correspondent host of its location determine the degree to which the new approach is better. This is because it is possible to avoid any forwarding of packets and not to require the mobile host to inform the correspondent host of its initial location; a query to the name server has already made the correspondent host aware of the initial location of the mobile host.

Figure 11:
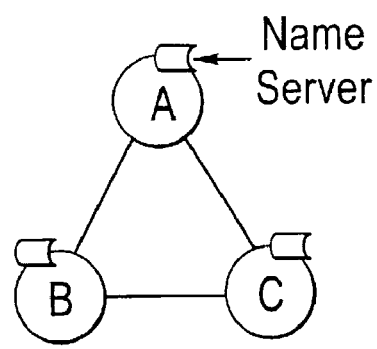
FIG. 11 is a simplified network corresponding to that of FIG. 9.

A second scenario is considered where the network of FIG. 9 is assumed to be divided into three domains as shown in FIG. 11. As opposed to the scenario of the first embodiment where a centralised database was used, the database is distributed with each domain having its own database. The location update traffic associated with one user (initially registered in domain B) is observed. Two cases are considered—one where only one type of location update is allowed and one where global and local updates are permitted. In the former case, every time the mobile changes its point of attachment, a binding update is sent to the home agent, resulting in the home name server being updated. In the latter case, global updates occur as a consequence of the mobile moving into another domain and local updates are initiated when the mobile changes its point of attachment within a domain. Results show that in the particular scenario being observed, a 16.5% reduction in signalling traffic can be achieved when two levels of location updating are considered. The signalling traffic here refers to any messages associated with the process of location tracking only.

Figure 12:
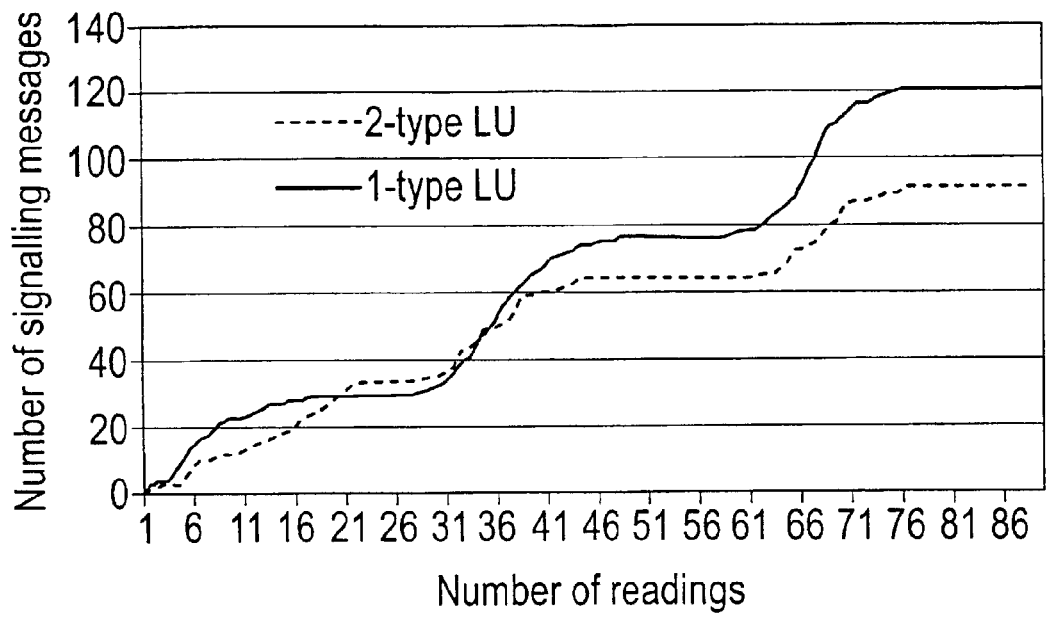
FIG. 12 is a graph showing the cumulative distribution of signalling messages in different updating schemes.

FIG. 12 shows the cumulative distribution of the number of signalling messages generated in the network as the simulation proceeds. 1-type LU refers to a trace obtained when only global updating is enabled. 2-type LU represents the distribution when both global and local updating are allowed. The number of signalling messages initiated in the network is monitored at regular time intervals, shown as number of readings on the x-axis. From the graph, it is clear that the introduction of 2 types of location updates reduces the overall signalling load associated with location updating considerably. This is due to the fact that firstly global updating only takes place when the mobile crosses domains and secondly local updating generates less signalling traffic, the databases being closer to the location of the mobile. Therefore, the scheme is especially valuable when the mobile user is roaming far away from its home network and under conditions of low mobility of users across visited domains.

However, the gain achieved in terms of the reduction in location update traffic is offset by an increase in the traffic generated to locate the mobile when there is a need to send traffic to that user. In effect, for the same simulation, a 2.3% penalty is incurred in the total signalling traffic in the network when one call to the mobile user is included. The degree to which the mobile locating associated traffic increases depends on whether the correspondent node and the mobile node belong to same domains or not and also on the way in which the query is resolved. In the simulation considered, the resolver was operating in the non-recursive mode.

Therefore, to avoid the generation of an excessive load of signalling messages when a connection needs to be set up, the use of caching is envisaged. When a correspondent node requests the address of a mobile, it caches the response in the local name server. Any further queries about the address of that particular mobile could be resolved locally as long as the entry does not expire.

The Third Embodiment

The first and second embodiments of the invention discussed above have been concerned with mobility within an Internet network. The present invention is not limited to this, and another embodiment of the present invention is concerned with global roaming, which may involve movement between networks of different types, such as Internet networks and cellular telephone networks.

One of the requirements of global roaming is that a mobile user has to be recognisable in any network. Presently, this is not the case given that different networks use different addressing schemes. In this third embodiment a scheme for using the IPv6 address space for global addressing is proposed, whereby telephone numbers can be integrated with IPv6 addresses.

Figure 13:
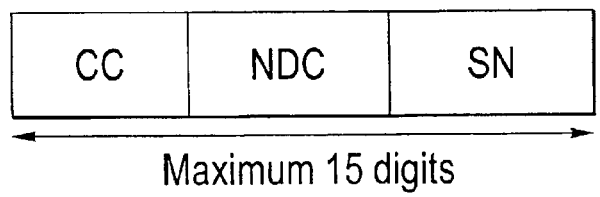
FIG. 13 shows the structure of a mobile telephone number following the E.164 system.

The world of telephony uses numbers that follow the ITU E.164 specification. Such a number consists of a maximum of 15 digits including a country code (CC), a national destination code (NDC) and a subscriber number (SN), as shown in FIG. 13. The length of the country code varies between 1 and 3 digits.

The country code identifies the destination country. A combination of the national destination code and the subscriber number constitutes a national significant number, which identifies the destination subscriber.

Assignment of country codes falls under the responsibility of ITU. Each country's naming authority is then allowed to choose area codes and for each area, each central office is given an exchange number. Finally, the last four digits of a telephone number are assigned to a particular local loop from a central office to a subscriber. Therefore, the numbering scheme for telephones in the world follows a hierarchical structure.

In GSM, a mobile subscriber is identified by its mobile station ISDN number (MS-ISDN) and its International Mobile Subscriber Identity (IMSI). The MS-ISDN has the same structure as an E.164 number, including a country code, a national destination code and a subscriber number. The national destination code is allocated to GSM PLMN. A combination of the country code and the national destination code provides routing information to the HLR of the mobile.

Figure 14:
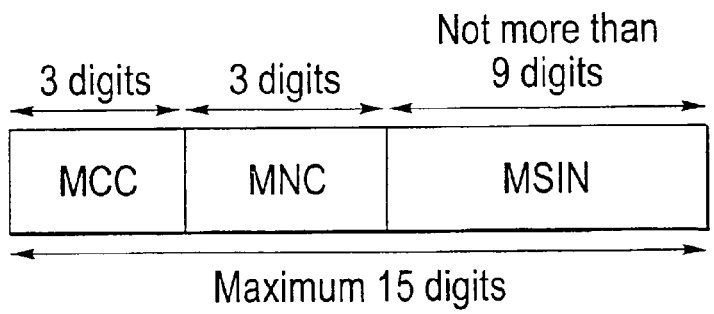
FIG. 14 shows the international mobile subscriber identity structure used in mobile telephony.

The IMSI is assigned to each authorised GSM user. It consists of a mobile country code (MCC), a mobile network code (MNC) and a PLMN unique mobile subscriber identification number (MSIN) [7]. The length of the IMSI does not exceed 15 digits and the structure is as shown in FIG. 14.

In the Internet, hosts are currently identified by an IPv4 address, which is 32 bits long. These addresses, referred to as IP addresses, are used to represent interfaces rather than endpoints so that if a host has more than one interface, it will have an IP address for each interface. An IPv4 address consists of a two-part hierarchy whereby the first part is known as the network number and the second part is called the host number.

IPv4 addresses fall into three different classes, depending on the partitioning between the number of bits for the network number and the host number.

Class A addresses have 8 bits allocated to the network number and 24 bits of host number.

Class B addresses have 16 bits for the network number and for the host number.

Class C addresses have 24 bits for the network number and 8 bits allocated to the host number.

The next generation of IPv6 provided a solution to the address space problem by extending the length of an IP address to 128 bits. IPv6 uses address prefixes, as in CIDR, to allow aggregation without reference to classes of addresses. Besides that, the specific type of an IPv6 address is indicated by the leading bits of the address. This field called the Format Prefix, also enables reservation of a portion of the address space for that type of addresses. For example, the prefix 001 denotes that the remaining portion is an aggregatable global unicast address where as prefix 1111 1111 shows that the address held is a multicast address. This is shown in FIG. 15.

The aggregatable global unicast address is designed to support both provider-based aggregation as well as a new type of exchange-based aggregation. This combination can allow efficient routing for sites that connect directly to providers and for sites that connect to exchanges. An aggregatable address is organised into a three-level hierarchy including the public topology, the site topology and an interface identifier. Thus, an IPv6 address of this format can have a topological or geographical significance.

In order to realise global and seamless roaming, it is required to develop a scheme whereby a terminal is recognised in all networks and can be reached irrespective of its point of attachment. In order to make sure that terminals are reachable anywhere, there is a need to manage the location of terminals at a global level. This calls for the deployment of databases that are accessible to all networks.

Thus, in this third embodiment of the invention the scheme devised to improve mobility management in IP is extended such that it can be used across different networks. Note that by using the arrangement of the first embodiment, a mobile locating phase is included in the arrangement and is therefore similar in principle to location management techniques of cellular systems. Therefore, databases that can be in a similar form to name servers in the Internet are required to be deployed globally except that they will need to maintain a lot more information than is required for simple terminal mobility.

The essence of a global location management scheme is that all terminals are identified by their IPv6 addresses. All location management is done in terms of IPv6 addresses only. The databases therefore maintain a record of the IPv6 address of a terminal, which identifies its point of attachment in a network. As the mobile terminal roams, location updates sent to the database identify its new position in terms of an IPv6 address. Any query to the database yields an IPv6 address so that routing and connection set-up takes place between IPv6 endpoints.

Figure 16:
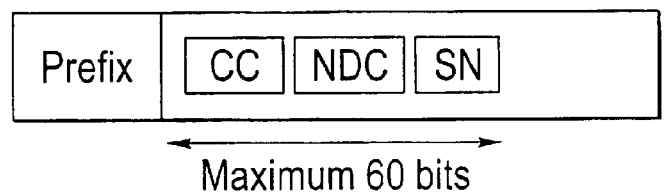
FIG. 16 shows the structure of an integrated E. 164/IP address.

Since this third embodiment utilises IPv6 addresses only, E.164 numbers need to be integrated with IP addresses. An E.164 number requires a maximum of 60 bits to be represented, if each of its digits were mapped onto 4 bits. Therefore, there is adequate space in the IPv6 address domain for allocation of a portion to represent telephone numbers. The Format Prefix is chosen to indicate that this type of address represents a telephone number, and this is shown in FIG. 16.

Having a combined address ensures that every telephone number has its equivalent IP address. In the mobile world, a mobile terminal is identified by its MS-ISDN number and its IMSI, which all have a maximum of 15 digits. Therefore, these numbers can be mapped on to IP addresses.

The third embodiment imposes some additional requirements in cellular systems, in order to extend the DNS-based protocol to such systems. In particular:

1. Entities have to be identified in the cellular network that will provide for home agent and foreign agent functionality. The MSCs have been chosen for that purpose—they correspond to the switching/routing unit in FIG. 17. The functionality of the MSC needs to be enhanced: the MSC closest to the HNS provides for home agent functionality. The MSC being accessed by a mobile in a visited network needs to act as a foreign agent.

2. In accordance with the global location management architecture, MSCs need to be assigned an IPv6 address. An MSC and the entities within its coverage such as the BSS and the VLR can be seen to constitute a subnet.

3. A home name server (HNS) is co-located with the GSM HLR and may eventually replace the HLR.

4. The GSM location registers (HLR and VLR) are identified by IPv6 addresses or integrated E.164/IP address in the case where E.164 numbers are already used to identify the location registers.

5. The resource record corresponding to a cellular user in a name server has the following values for the fields given below.

| Name | E.164 number |
| --- | --- |
| Permanent address | E.164/IPv6 integrated address |
| Temporary address | E.164/IPv6 integrated address |

The name is an E.164 number corresponding to the MS-ISDN number of the user. The permanent address is the IPv6 address representing the IMSI. The temporary address (in the home name server) is the IPv6 address representing the address of the VLR.

6. The VLR may have to be equipped with additional functionality such that it is able to respond to a DNS query. Typically, a DNS query to a home name server can be referred to a VLR, where it has to be processed. If such functionality cannot be built into the VLR, a Local Name Server has to be co-located with the VLR where details of the care-of-address of any mobile are recorded. The Local Name Server then responds to a DNS query and under such conditions, a resource record corresponding to a cellular user in the home name server will have the temporary address field set to the address of the local name server.

7. When an IP terminal roams into a cellular system, it will provide its identity to the system as an IP address, namely its permanent address. The MSC acting as foreign agent has to be able to understand the address and initiate procedures for location updating accordingly.

8. When a cellular terminal roams to an IP-based system, it has to be equipped to detect movement and also supply its IMSI to the foreign agent for authentication and registration. It can be enhanced such that it provides that address as an IPv6 address. As a result, it receives a care-of-address from the foreign agent and records that.

Location management in cellular systems is carried out using a sequence of MAP messages, where the essence is to update the VLR and HLR as the mobile roams across different location areas and across coverage of different MSCs.

Usually when a mobile moves into the coverage of a VLR, it is assigned a TMSI, which is an MSC-VLR specific alias designed to maintain user confidentiality. If another user wants to set up a call to the mobile, the HLR queries the VLR, which then assigns an MSRN to the mobile terminal. The MSRN, which abides by E.164 format, is used by the HLR for re-routing calls to the mobile terminal by directing the call to the MSC/VLR exchange where the called subscriber is currently registered.

Extension of the DNS-based protocol to a global location management scheme proposes the use of a home name server in the home domain, which points to a VLR if the mobile is roaming under cellular coverage. Therefore, assuming the VLR is enhanced with capabilities to respond to a DNS query or is coupled with a LNS for that purpose, an MSRN is sent back to the correspondent node. The MSRN, being an E.164 number, can be transmitted as an integrated E.164/IPv6 address, which is then used by the correspondent node for sending packets to the mobile. The question is how do these packets get transferred to the mobile terminal.

A proposed solution requires the VLR to allocate an MSRN to a mobile not on a per-call basis, but whenever a mobile roams under its coverage for the first time. The mobile has to be notified of its MSRN. Subsequently, it can use that address (in IPv6 format) as the source of its packets and can also identify packets that are destined for it. This solution also facilitates roaming of IP-based terminals to cellular systems. Therefore, the protocol of location management in cellular systems has to be modified such that 1. Besides allocating a TMSI to a mobile terminal, the VLR also has to notify it of its MSRN.

2. When the VLR processes a query regarding a mobile and responds by providing the MSRN, it also sends a message to the corresponding MSC, informing it to expect packets with MSRN as destination.

3. The MSC has the choice of requesting the LAI and TMSI from the VLR at that time in order to page and locate the mobile or it can wait until it receives the packets intended for the mobile.

4. A cellular terminal therefore needs to keep a record of the MSRN it is allocated apart from the LAI and TMSI.

Figure 17:
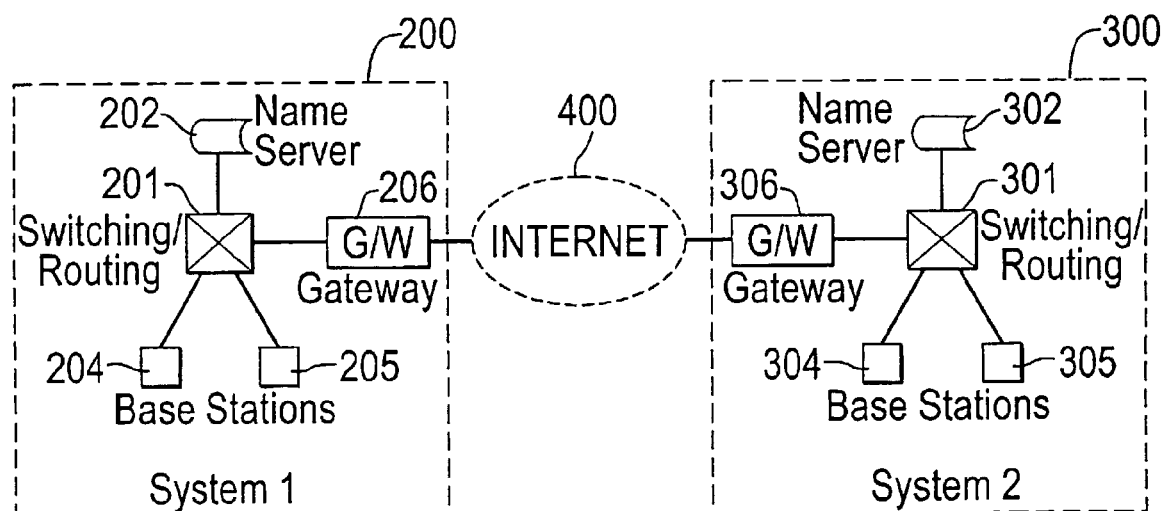
FIG. 17 shows the structure of a network involving Internet and other mobile communications.

Consider now the network arrangement shown in FIG. 17, in which two systems 200, 300 are connected via the Internet 400. For simplicity, in FIG. 17 each network 200, 300 comprises a switching and routing unit 201, 301 connected to a name server 202, 302 and serving base stations 204, 205, 304, 305. Each switching and routing unit 201, 301 is connected by a respective gateway 206, 306 to the Internet 400. In FIG. 17, the networks 200, 300 can be an Internet-based system such as described with respect of the first and second embodiments, or a cellular network. In the following discussion, the network of the first and second embodiments will be referred to as an IP based system and the following abbreviations will be used:

| | |
| --- | --- |
| GMSC | Gateway Mobile Switching Centre |
| HLR | Home Location Register |
| HNS | Home Name Server |
| IAM | Initial Address Message |
| IMSI | International Mobile Subscriber Identity |
| IP | Internet Protocol |
| ISDN | Integrated Services Digital Network |
| LAI | Location Area Identity |
| MS | Mobile Station |
| MSC | Mobile Switching Centre |
| MSRN | Mobile Station Roaming Number |
| TMSI | Temporary Mobile Subscriber Identity |
| VLR | Visitor Location Register |

The mobile terminal has to detect movement within a specific network and across different networks. It should therefore be able to use mechanisms of IPv6 neighbour discovery to determine if it is within coverage of an IP-based network and also listen and measure the BCCH signal to know if it is roaming within a cellular network.

This also requires the counterpart entities in the fixed part of the network to advertise their presence.

The process of care-of-address formation may involve collaboration between the mobile host and the generalised foreign agent depending on the network that the mobile belongs to and the network where it is currently roaming. A mobile node may also be able to configure its own care-of-address.

For example, when an IP-based terminal roams within a wireless LAN environment, it may be able to acquire a care-of-address by itself. However, if a cellular terminal moves to a wireless LAN, it requires the assistance of the foreign agent in order to be assigned a care-of-address. When terminals roam to a cellular environment, they are usually allocated a TMSI. The new protocol requires that they also be assigned an MSRN when they roam to the coverage area of an MSC for the first time. This MSRN is in effect the care-of-address of the mobile terminal.

Location updating involves two stages: local registration and global registration. Local registration usually proceeds according to the protocols already in place in the network where the mobile is. In the Internet, the foreign agent updates the local name server whereas in cellular systems, the enhanced MSC updates the VLR.

Global registration requires the generalised foreign agent to create and send a binding update to the home agent, which then updates the home name server. Irrespective of the network the foreign agent belongs to, it must be able to participate in the process of global updating. If the foreign agent is in an IP-based network, it supplies a binding update, which is an association between the permanent address of the mobile and the address of the local name server. If the foreign agent is in a cellular network, the binding update provides the address of the VLR in the care-of-address field. In both cases, the source of the update is the IPv6 address of the foreign agent and the destination is the IPv6 address of the home agent, which may be an enhanced MSC or an IP router.

The process of mobile locating involves the correspondent node launching a query to the home name server to obtain the address of the mobile. From the home name server, the query is forwarded to the local database, which could be a VLR or an LNS. If the local database is in an IP-based network, the LNS responds by providing the actual care-of-address of the mobile terminal. If the local database is a VLR, it supplies the MSRN of the mobile terminal and it also needs to inform the local MSC that packets destined for the mobile are expected. The MSC can then initiate procedures for paging and locating the mobile. The correspondent node uses the address it receives, which is an IPv6 address, to send packets.

Control being shared between the mobile node and the foreign agent, management of the lifetime of the global binding falls under the responsibility of the foreign agent. In the Internet, the mobile terminal examines binding acknowledgements to determine if it is roaming in the same domain or not—this enables the mobile terminal to know and record the address of its first foreign agent.

Given cellular terminals are allowed to roam to IP-based networks and IP terminals can attach to cellular systems, a different mechanism or message sequence is required to serve the purpose of the binding acknowledgement. In its simplest form, when a mobile registers with a generalised foreign agent, it provides its identity, the address of its previous foreign agent and that of its previous first foreign agent. In the cases mentioned, the current foreign agent has to be involved in the process of care-of-address allocation and when it notifies the mobile of the new care-of-address, it may attach a status value to the message indicating whether the mobile is in a new domain or not. It can also take actions to send redirection and de-registration binding updates to the appropriate entities as needed. The messages used for communication between the mobile terminal and the generalised foreign agent are network and mobile specific and have to be defined—only the content of the message has been specified here.

In establishing how to ensure smooth handover, only redirection of packets is considered. Aspects associated with establishment and tearing down of specific connections are not dealt with. Therefore, via the process of sending redirection binding updates to the previous foreign agent, it is ensured that packets directed to the previous network are forwarded to the mobile. The entities involved are the current and previous foreign agents, both of which understand the use of binding updates, irrespective of the networks they belong to.

The fact that a global addressing scheme based on IPv6 addresses is a feature of the global location management scheme provides the opportunity to extend dynamic home agent discovery to cellular systems. In particular, a group of MSCs may be assigned a home agents anycast address. When a cellular terminal roams to a foreign subnet and needs to send a binding update to its home network, the binding update can be sent to the anycast address. One of the MSCs acknowledges the binding update thereby providing the mobile terminal with the addresses of possible home agents. MSCs can be configured such that they constitute subnets with a particular subnet prefix that may include digits from the IMSI of mobile terminals. The foreign agent may then infer a home agent anycast address given the IMSI of a mobile terminal.

The use of dynamic home agent discovery provides a means of improving the reliability of the system by reducing the dependency on a single home agent. A mobile terminal need not be assigned a home agent for its whole lifetime and as a mobile terminal roams to different subnets, it may access different home agents. This also provides a way of balancing the load on a number of home agents. In such an arrangement, four possible movements (scenarios) when a mobile terminal changes (roams) from one network to another, will be considered, which depend on the type of network and the type of terminal. The scenarios are:

(i) IP terminal roams between IP-based networks (ii) Cellular terminal roams between cellular networks (iii) IP terminal roams to cellular network and (iv) Cellular terminal roams to IP-based network.

For the first scenario, the IP terminal roams between IP-based networks, and this is then the same as the first or second embodiment.

For the second scenario, the cellular terminal roams between cellular systems. The steps that occur are as follows:

1. A mobile user moves into the coverage area of an MSC for the first time. It identifies itself by transmitting its IMSI together with the identities of the present location area and the one it had in store. It may also supply the address of its previous foreign agent and that of its previous first foreign agent.

2. After successful authentication, the mobile host is allocated a new TMSI. The VLR maintains a record of the TMSI and LAI of the mobile. The HLR is informed of the VLR that keeps track of the mobile if it is still in use. The VLR has to assign an MSRN to the mobile and notifies it of its new address.

3. The current MSC assumes the role of a foreign agent and sends a binding update to the home agent, which is in this case another MSC. The MSC can infer the address of the home agent or a home-agents anycast address from the IMSI. The fields of the update are set as follows:

Source: IPv6 address of current MSC

Destination: IPv6 address of home agent (another MSC) or home-agents anycast address Care-of-address: address of VLR T flag: not set (database address)

Lifetime: duration of lifetime of binding update

Home address option: IMSI of mobile in IPv6 format

7. If a home-agents anycast address is used, the MSC choosing to act as home agent replies and provides its address. Another binding update can then be sent to it.

8. The home agent updates the home name server accordingly upon receipt of the binding update.

9. If the mobile moves across location areas that fall under the coverage of the same VLR, a new TMSI is allocated and only the VLR is updated. There is no need to allocate a new MSRN. The HNS needs not be updated.

10. If the mobile moves into a new VLR area, the HLR, old VLR and the new VLR are updated with old records being deleted and new records being added. A new TMSI and MSRN are allocated and the new MSC has to send a global binding update to the home agent, which updates the home name server accordingly.

11. Whenever the mobile moves under the coverage of a new MSC, the current MSC sends a redirection binding update to the previous one giving the new MSRN as care-of-address.

In the third scenario, the IP terminal roams to cellular system. The stages that occur are as follows:

1. The mobile terminal detects movement to a cellular system.

2. It provides its IPv6 address for identification. It may also provide the address of its previous foreign agent and first foreign agent.

3. The local MSC acts as a foreign agent and may use this address for authentication.

4. The mobile keeps a record of the new LAI. It is also assigned a TMSI and an MSRN where the MSRN can be interpreted as its care-of-address.

5. The mobile host requests the local MSC to send a binding update to its home agent by supplying the address of its home agent or a home-agents anycast address.

6. The MSC sends a binding update to the home agent with the following fields:

Source: IP address of MSC

Destination: IP address of home agent or home-agents anycast address

Care-of-address: IP address of VLR

T flag: not set (address of another database)

Home address option: permanent IP address of mobile node

7. The home agent updates the home name server accordingly.

8. As long as the mobile terminal roams under the coverage of the same MSC/VLR, only the LAI and TMSI are updated if it crosses location areas. If the mobile moves to a new MSC/VLR coverage area, global updating is required with a new MSRN being assigned.

Finally in the fourth scenario, the cellular terminal roams to an IP-based system. The steps that occur are as follows:

1. The mobile station detects movement to IP-based system.

2. Mobile provides its IMSI to the foreign agent for identification and authentication. It may also give the address of its previous foreign agent and that of its first foreign agent.

3. The foreign agent allocates a care-of-address to the mobile host.

4. The foreign agent needs to determine if both local and global updating are required. If local updating only is required, the foreign agent updates the local name server, giving the care-of-address of the mobile.

5. If global updating is required, the foreign agent sends a binding update to the home agent, whose address is inferred from the IMSI. A home-agents anycast address may also be used. The fields of the binding update are:

Source: address of current foreign agent

Destination: address of home agent or home-agent anycast address

Care-of-address: address of local name server

T flag: not set (name server address)

Home Address option: IMSI in IPv6 format

Lifetime: duration of lifetime of binding update

6. The home agent may be an MSC close to the Home Name Server and updates the HNS accordingly.

7. As long as the mobile roams in the domain under the authority of the local name server, only local updating is required. Redirection binding updates are also needed, which should be taken care of by the new foreign agent. When the mobile moves to a new domain, global updating is required and the previous first foreign agent must also be informed.

Call and connection establishment scenarios will now be discussed. It is now assumed that all terminals, cellular or IP-based, are capable of participating in packet-based communication. When a user wants to communicate to another mobile user, a query is launched to the name servers to identify its location. The correspondent host (initiator of the connection) supplies a name or an E.164 number, from which the system determines the address of the home name server to be queried. From the home name server, the query may be referred to a local database in order to obtain the care-of-address of the mobile terminal. Although the principles underlying mobile locating and connection set-up are the same, the manner in which they are done depends on where the originator and the recipient of the call are. The possible cases are considered below.

How a call is initiated depends on the application that is used at the originator. If the terminal is an IP-based terminal, applications such as telnet or ftp will require a hostname leading to a query to the DNS being launched. The address of the host may be supplied directly, which would cause the communication to be directed to the home domain of the host, from where packets may be tunnelled to the mobile host. Whether the originator is fixed, accessing a wireless LAN or a cellular system is not relevant as when the application is started, the resolver automatically generates a DNS query. If the terminal is accessing an IP-based system, the query is pursued as is normally done in the Internet. If it is in a cellular system, the DNS query will be sent to the required name via the MSC. The query may be referred to known name servers before it is eventually sent to the home name server.

If the terminal is a cellular one and is now assumed to be able to participate in packet communication, launching an application should result in a DNS query. Resolver capabilities have to be built into the terminal. Then, irrespective of the network the terminal is connected to, the query will be pursued to the relevant home name server.

Note that in both cases, the parameter supplied to the application can be a hostname or an E.164 number. Even when an E.164 number is given, a query is launched to the relevant name server to identify the location of the recipient.

Two cases will now be considered. In the first case, assume that the destination is an Internet user, which is currently connected to an IP-based network. Although the following discussion is for a mobile terminated call, the same set of procedures is adopted for a fixed host.

1. At the originator, the user supplies the application with the name of the recipient.

2. This causes the resolver at the originator to initiate a query to the Domain Name System.

3. Given the name of the destination, the resolver knows where to direct the query, which usually would go to the home name server.

4. From the home name server, the query may be referred to the local name server.

5. The result from the local name server is a care-of-address identifying the point of attachment of the mobile. If the mobile is at home (or the terminal is fixed), it is possible that the query will be resolved at the home name server itself.

6. When the originator receives the address of the recipient, packet transmission can be initiated where the destination field is set to that address.

In the second case, the destination is an Internet user who is roaming in a cellular network.

1. As in the first case, a query is launched to the home name server.

2. This results in a query being launched to the VLR.

3. The VLR needs to have the capabilities to process and respond to the query. It sends the MSRN back to the originator of the query.

4. When the source of the call receives the MSRN, it can start packet transmission setting the destination of the packets to be that address. Note that the MSRN is returned as an IPv6 address.

5. When the VLR sends the MSRN to the originator of the call, it also sends the MSRN to the MSC, acting as foreign agent for the mobile terminal.

6. This entails the MSC asking for the LAI and TMSI from the VLR, following which the process of paging and locating the mobile can take place.

7. Thereafter, when the MSC receives a packet destined for the given MSRN, it knows where to forward the packet.

Two cases are now discussed where the recipient is a cellular user. In the first case, the destination is a cellular user in a cellular network. The originator of the call may be another cellular user or an Internet user. In both possibilities, the application will typically be supplied with the E.164 number of the destination.

1. When the user supplies an E.164 number, the resolver at the originator has to send the query to the appropriate home name server, which has authority over the network where the destination is registered.

2. The query is pursued to a VLR leading to an IPv6 address (MSRN) being sent back to the originator.

3. The VLR also sends the MSRN to the correct MSC, from where the process of paging is started. This enables locating the mobile terminal.

4. Packet transmission can then start from the originator with the destination of the packets being set to the IPv6 address (MSRN) identifying the location of the mobile. The MSC forwards the packets to the right mobile when it receives them.

In the second case, the destination is a cellular user connected to an IP-based network.

1. The same procedures as above take place except that from the home name server, the query is pursued to a Local Name Server. The address returned is a care-of-address identifying the mobile's point of attachment in the IP-based network.

2. Once it receives that address, the originator can start transmitting packets to that destination.

The invention claimed is:

1. A method of operating a network, the network comprising a plurality of interlinked domains, each domain having a DNS name server associated therewith, each domain having a least one subnet, wherein:

a mobile terminal is associated with a first domain of said plurality of interlinked domains and a first subnet within said first domain, a DNS name server of said first domain storing a name for said mobile terminal and a first output address of said mobile terminal, which first output address includes an identifying identification of said first subnet, whereby the input to the network of said name for said mobile terminal causes said DNS name server of said first domain to output said first output address;

when said mobile terminal moves to a second subnet associated with a second domain of the plurality of interlinked domains, said DNS name server of said second domain stores said name for said mobile terminal and a second output address for said mobile terminal, said second output address including an identification of said second subnet, and said first output address stored in said DNS name server of said first domain is updated with an address of said DNS name server of said second domain, whereby an input to said network of said name for said mobile terminal causes said DNS name server of said first domain to output an address of said DNS name server of said second domain, and causes said DNS name server of said second domain to output said second output address; and when said mobile terminal moves to a third subnet, also within said second domain, said second output address stored in said DNS name server of said second domain is updated with a third output address, said third output address including an identification of said third subnet.

2. A method according to claim 1, wherein no signal is sent between said first domain and said second domain as a consequence of the mobile terminal moving from the second subnet to the third subnet.

3. A method according to claim 1, wherein said mobile terminal requests that an update be sent to said DNS name server of said second domain upon moving to said third subnet.

4. A method according to claim 1, wherein said DNS name server of said second domain transmits updates to said DNS name server of said first domain regarding status of said mobile terminal.

5. A method according to claim 1, wherein when said mobile terminal moves to a location within a third domain of said plurality of interlinked domains, a DNS name server of said third domain is configured to notify said DNS name server of said first domain to update said address of said DNS name server of said second domain with an address of said DNS name server of said third domain.

6. A method according to claim 1, wherein when said mobile terminal moves to a location within a third domain of said plurality of interlinked domains, said mobile terminal is configured to notify said DNS name server of said first domain to update said address of said DNS name server of said second domain with an address of said DNS name server of said third domain.

7. A network comprising a plurality of mobile terminals and communication means for permitting communication between said plurality of mobile terminals, said communication means comprising a plurality of interlinked domains, each domain having a DNS name server associated therewith, wherein,
- a first mobile terminal of the plurality of mobile terminals is associated with a first domain of the plurality of interlinked domains and a first subnet within said first domain, said DNS name server of said first domain being arranged to store a name and a first output address for said first mobile terminal, said first output address including an identification of said first subnet, whereby an input to said communication means of said name for said first mobile terminal is arranged to cause said DNS name server of said first domain to output said first output address;
- when said first mobile terminal moves to a second subnet within a second domain of the plurality of interlinked domains, a DNS name server of said second domain is arranged to store said name for said first mobile terminal and a second output address for said first mobile terminal, said second output address including an identification of said second subnet, and said DNS name server of said first domain is arranged to update said first output address with an address of said DNS name server of said second domain, whereby an input to said communication means of said name for said first mobile terminal is arranged to cause said DNS name server of said first domain to output an address of said DNS name server of said second domain, and to cause said DNS name server of said second domain to output said second output address; and
- when said first mobile terminal moves to a third subnet also within said second domain, said DNS name server of said second domain is arranged to update said second output address with a third output address for the first mobile terminal, said third output address including an identification of said third subnet.

8. A network according to claim 7, wherein no signal is sent between said first domain and said second domain as a consequence of the mobile terminal moving from said second subnet to said third subnet.

9. A network according to claim 7, wherein said mobile terminal requests that an update be sent to said DNS name server of said second domain upon moving to said third subnet.

10. A network according to claim 7, wherein said DNS name server of said second domain updates said DNS name server of said first domain regarding status of the mobile terminal.

11. A network according to claim 7, wherein when said mobile terminal moves to a location within a third domain of said plurality of interlinked domains, a DNS name server of said third domain is configured to notify said DNS name server of said first domain to update said address of said DNS name server of said second domain with an address of said DNS name server of said third domain.

12. A network according to claim 7, wherein when said mobile terminal moves to a location within a third domain of said plurality of interlinked domains, said mobile terminal is configured to notify said DNS name server of said first domain to update said address of said DNS name server of said second domain with an address of said name server of said third domain.

* * * * *

UNITED STATES PATENT AND TRADEMARK OFFICE
CERTIFICATE OF CORRECTION

PATENT NO. : 7,313,631 B1  
APPLICATION NO. : 10/070326  
DATED : December 25, 2007  
INVENTOR(S) : Amardiya Sesmun et al.

Page 1 of 1

It is certified that error appears in the above-identified patent and that said Letters Patent is hereby corrected as shown below:

In the drawings, Figure 15 should be included, and should appear as follows:

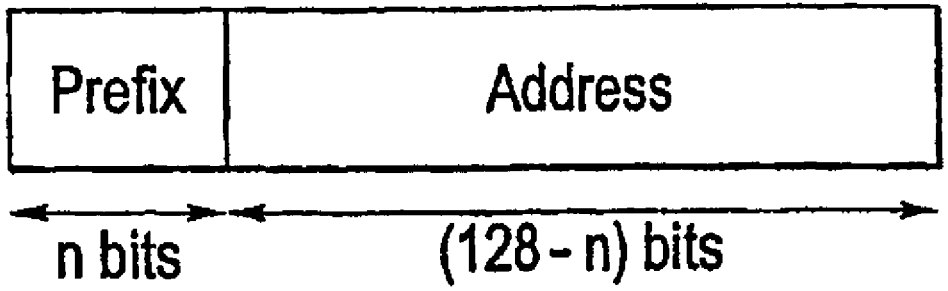

Fig. 15

Signed and Sealed this

Seventh Day of July, 2009

JOHN DOLL  
*Acting Director of the United States Patent and Trademark Office*